United States Patent [19]

Quatse

[11] Patent Number: 4,716,541

[45] Date of Patent: Dec. 29, 1987

[54] BOOLEAN PROCESSOR FOR A PROGRAMMABLE CONTROLLER

[76] Inventor: Jesse T. Quatse, 2 Fifer Ave. #250, Corte Madera, Calif. 94925

[21] Appl. No.: 637,772

[22] Filed: Aug. 2, 1984

[51] Int. Cl.[4] .......................... G06F 9/22; G06F 9/00; G05B 19/18
[52] U.S. Cl. .................................................. 364/900
[58] Field of Search ............................... 364/200, 900

[56] References Cited

U.S. PATENT DOCUMENTS

| | | | |
|---|---|---|---|
| 3,813,649 | 5/1974 | Struger et al. | 340/172.5 |
| 3,938,104 | 2/1976 | Henry et al. | 364/900 |
| 3,944,984 | 3/1976 | Morley et al. | 340/172.5 |
| 3,953,834 | 4/1976 | Burkett et al. | 364/900 |
| 3,978,454 | 8/1976 | Willard | 340/172.5 |
| 4,021,783 | 5/1977 | Highberger | 340/172.5 |
| 4,070,702 | 1/1978 | Grants et al. | 364/200 |
| 4,118,792 | 10/1978 | Struger et al. | 364/900 |
| 4,122,519 | 10/1978 | Bielawski et al. | 364/200 |
| 4,165,534 | 8/1979 | Dummermuth et al. | 364/900 |
| 4,200,914 | 4/1980 | Kintner | 364/900 |
| 4,200,915 | 4/1980 | Struger et al. | 364/900 |
| 4,213,174 | 7/1980 | Morley et al. | 364/104 |
| 4,215,395 | 7/1980 | Bunyard et al. | 364/200 |
| 4,215,396 | 7/1980 | Henry et al. | 364/200 |
| 4,215,398 | 7/1980 | Burkett et al. | 364/200 |
| 4,215,399 | 7/1980 | Pavicic et al. | 364/200 |
| 4,217,658 | 8/1980 | Henry et al. | 364/900 |
| 4,228,495 | 10/1980 | Bernhard et al. | 364/101 |
| 4,250,563 | 2/1981 | Struger | 364/900 |
| 4,266,281 | 5/1981 | Struger et al. | 364/900 |
| 4,302,820 | 11/1981 | Struger et al. | 364/900 |
| 4,553,224 | 11/1985 | Struger et al. | 364/900 |

FOREIGN PATENT DOCUMENTS

| | | |
|---|---|---|
| 1103362 | 6/1981 | Canada . |
| 1103364 | 6/1981 | Canada . |
| 1339028 | 12/1969 | United Kingdom . |
| 1596115 | 4/1978 | United Kingdom . |
| 2064920 | 10/1980 | United Kingdom . |

*Primary Examiner*—Gary V. Harkcom
*Assistant Examiner*—Andy W. Lacasse
*Attorney, Agent, or Firm*—Townsend & Townsend

[57] ABSTRACT

A very fast and efficient Boolean processor ("BP") (20) capable of compiling a full range of diagrams or expressions in ladder, logigram, and Boolean with a small but powerful instruction set. The BP includes an instruction decoder (34), combinatoric logic (35), a T-register (42) which holds the temporary results of a sequential AND operation, an N-register (43) which holds the initial Boolean value of T, a Binary Accumulator Memory ("BAM") (40) which is used as a scratchpad for a program which evaluates a ladder or logigram diagram or a Boolean expression, a source address ("S") in BAM (40) from which an initial operand is taken, a destination address ("D") in BAM (40) in which the result of an operation is stored, and a destination address register ("DAR") (45) in which the destination address is stored. The instruction set includes a subset of input instructions and a subset of structure instructions. The operand (I) of an input instruction is an address in IOIM (25). The operands (S,D) of a structure instruction are source and destination addresses in BAM (40). Each input instruction reads the value of a bit from IOIM and has the effect of logically combining this bit value with the value held in the T-register and possibly with the destination bit in BAM. The structure instructions cause operation on the pair of addresses S and D, and either describe the structure of the diagram to be compiled or permit the performance of logical functions between nodes in the diagram.

24 Claims, 15 Drawing Figures

Microfiche Appendix Included
(1 Microfiche, 23 Pages)

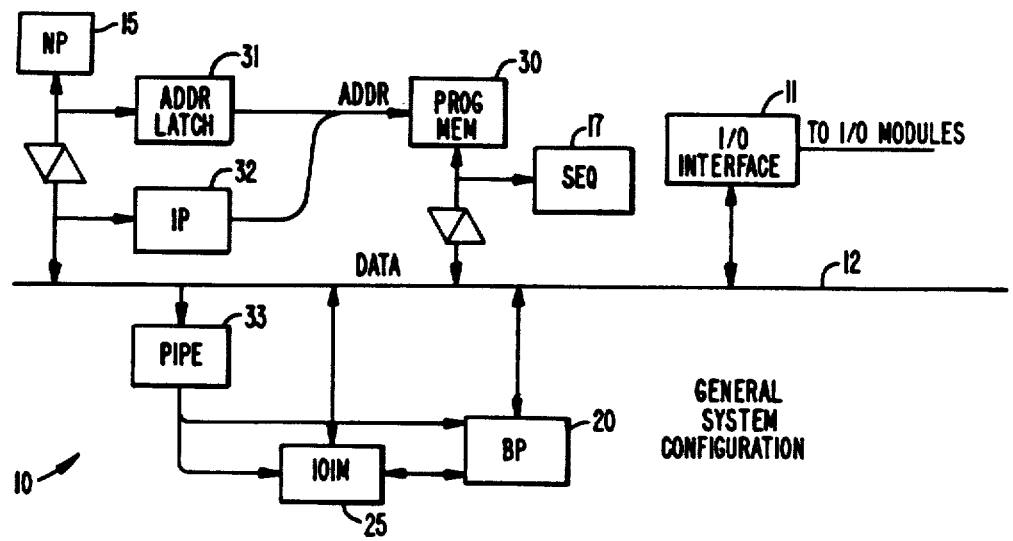
FIG._1.
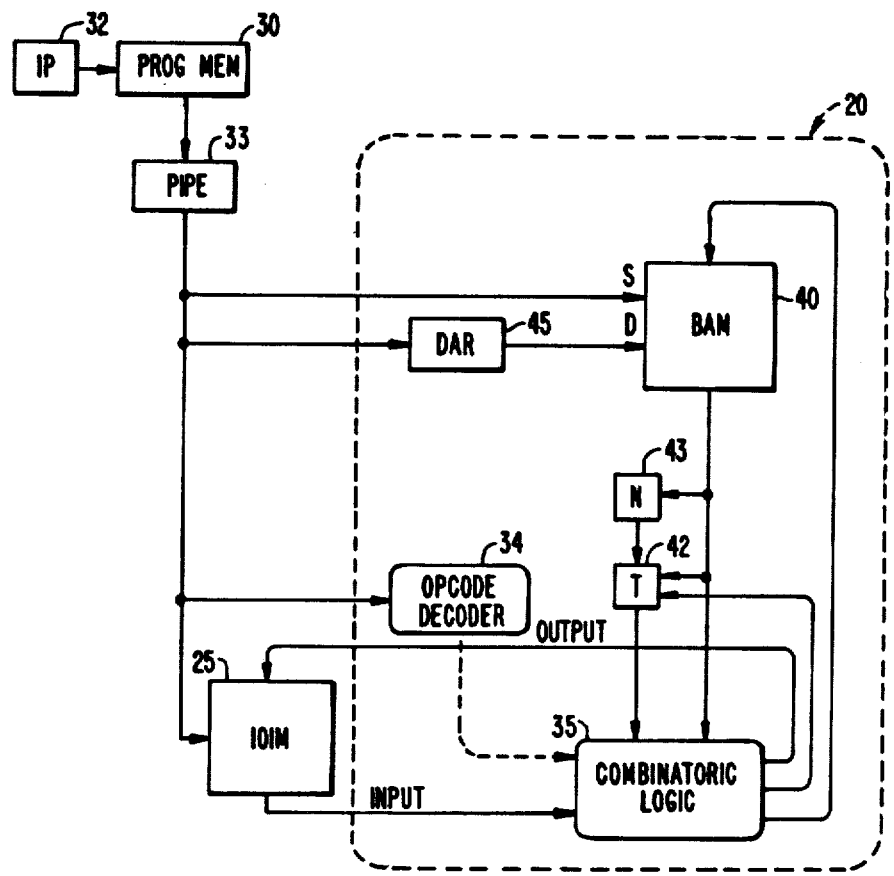
FIG._2.

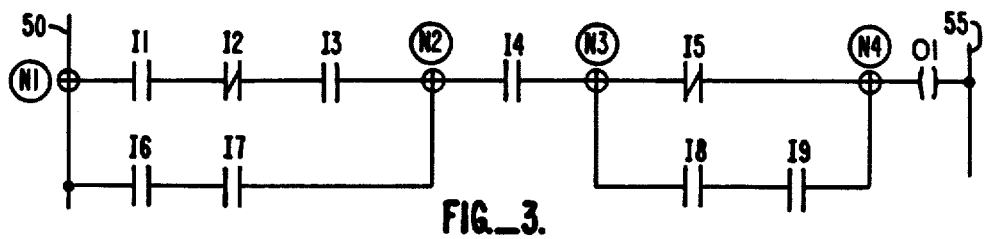
FIG._3.
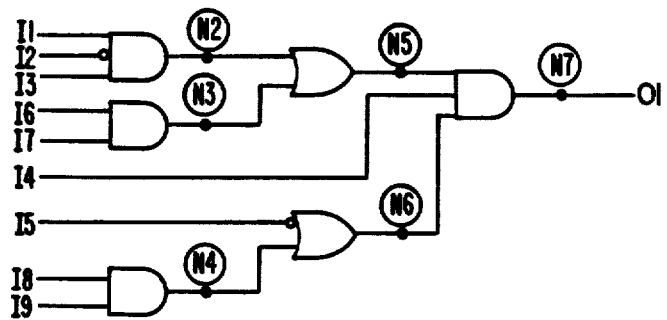
FIG._5.
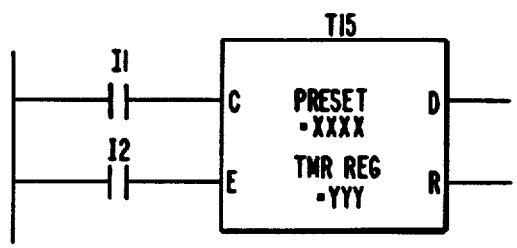
FIG._4A.
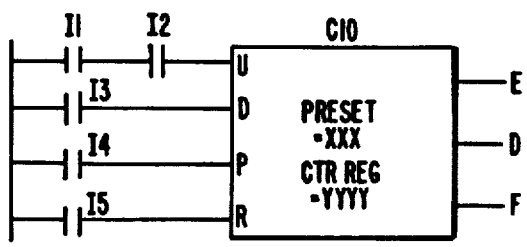
FIG._4B.

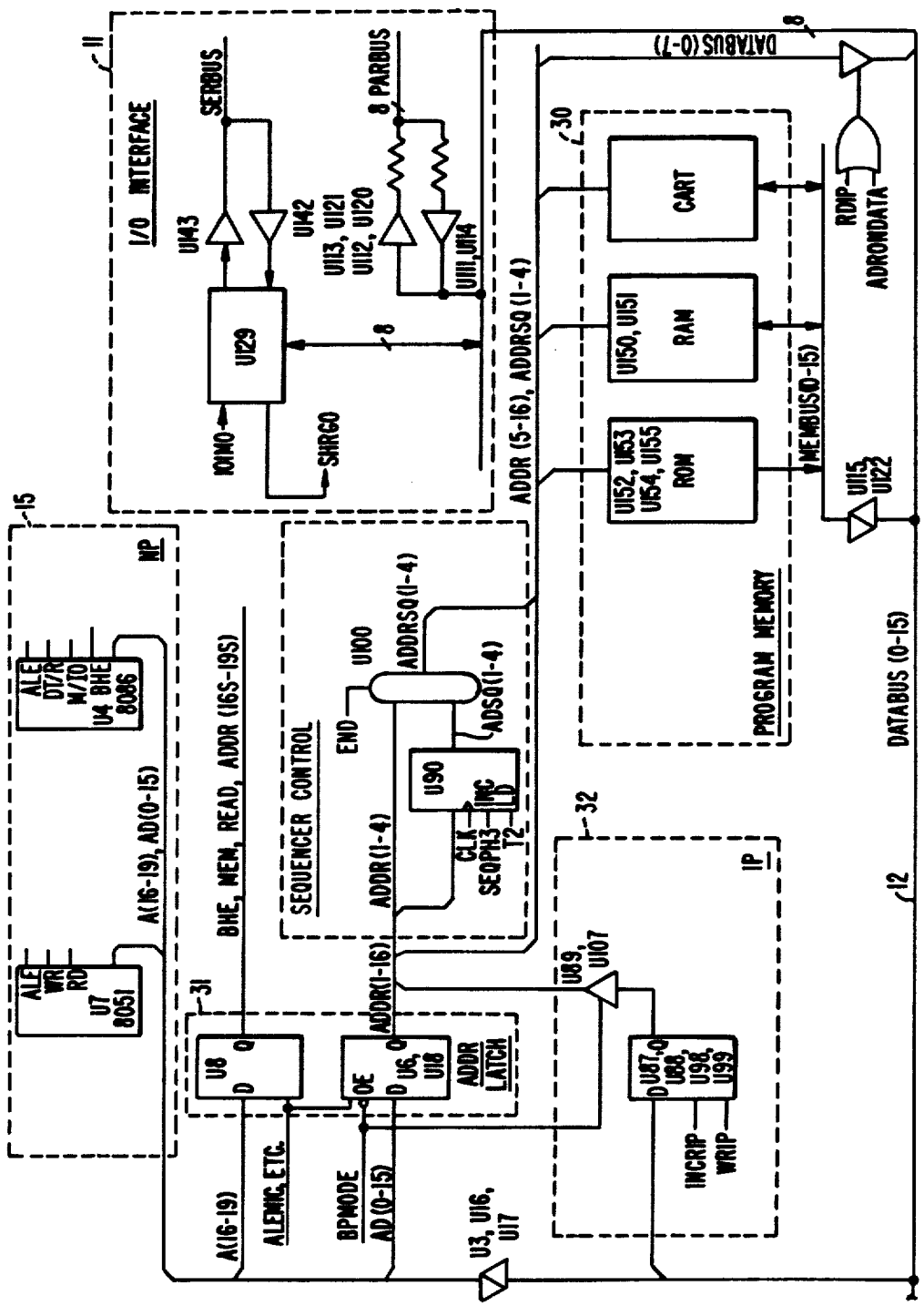
FIG.—6.

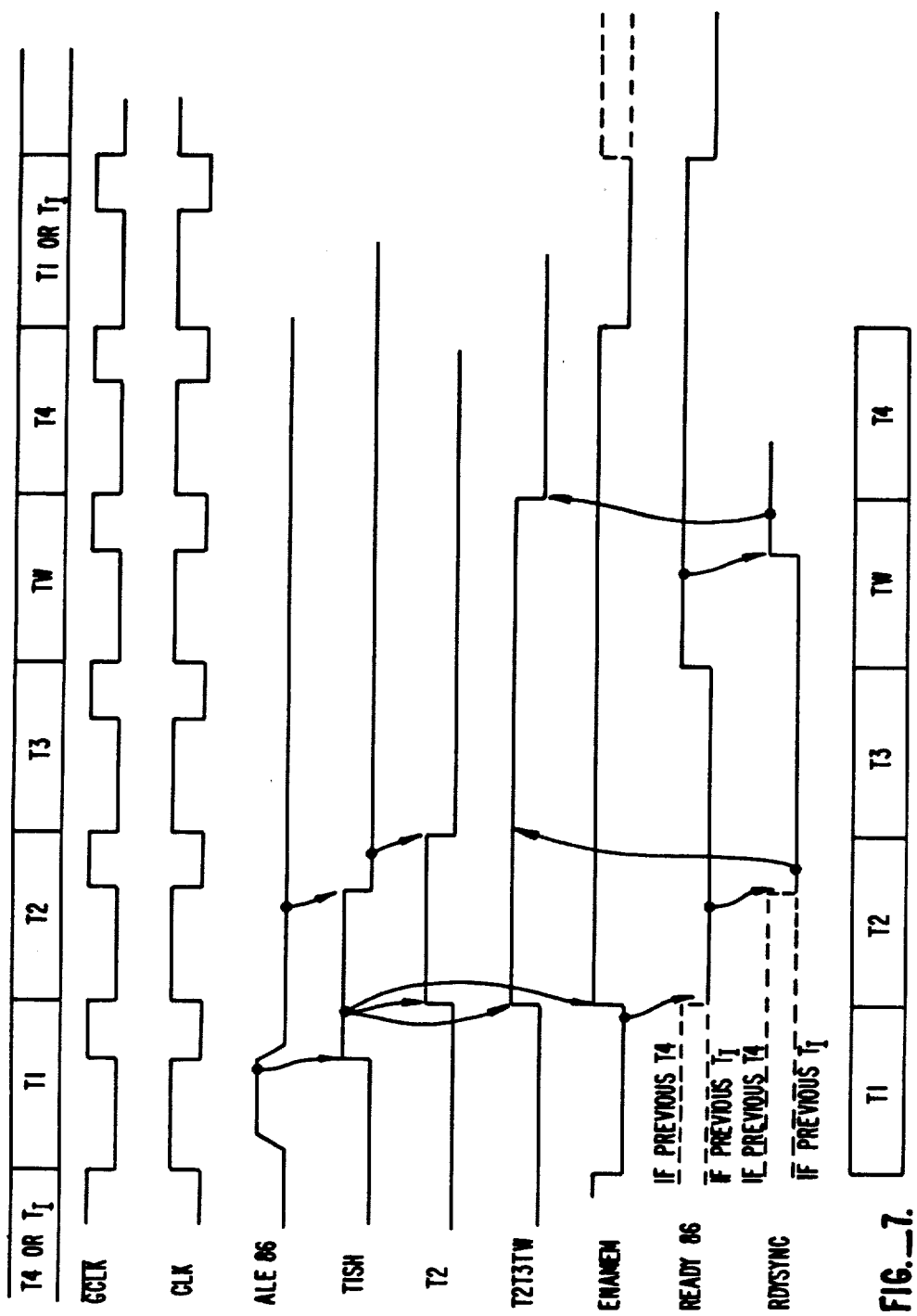
FIG._7.

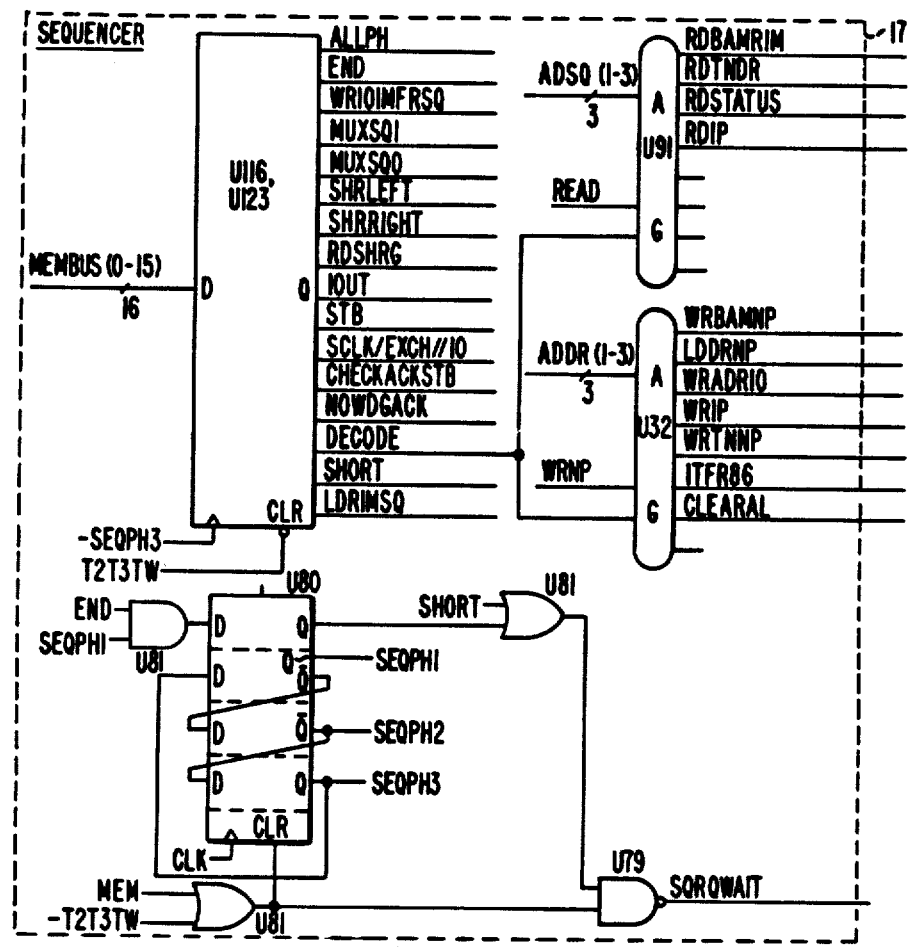
FIG._8.
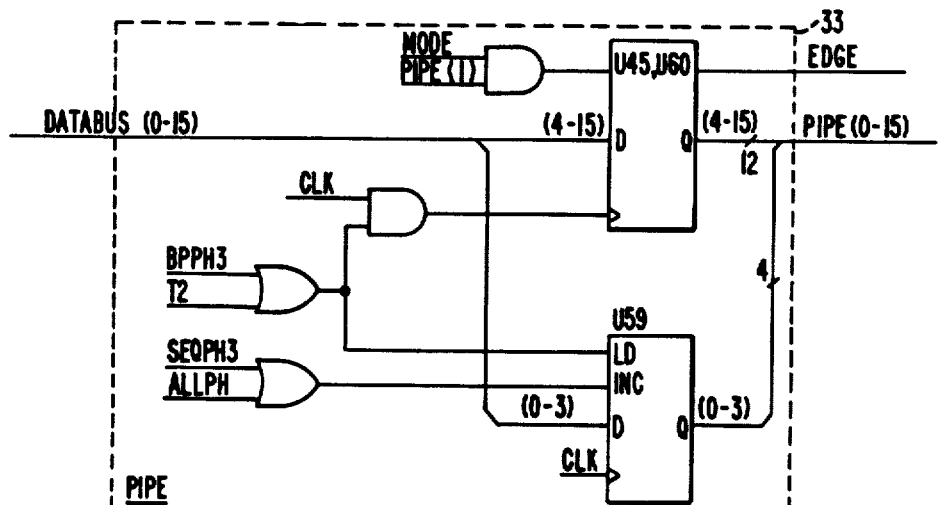
FIG._10.

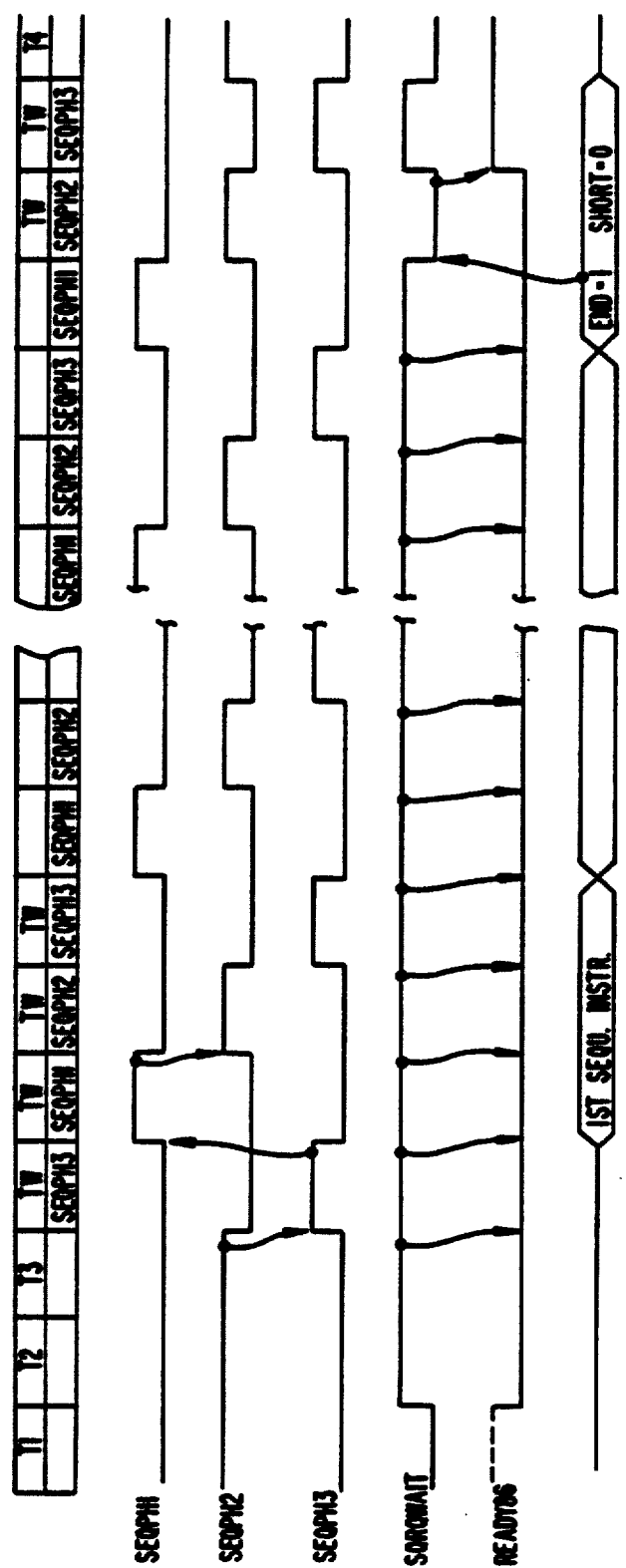
FIG._9.

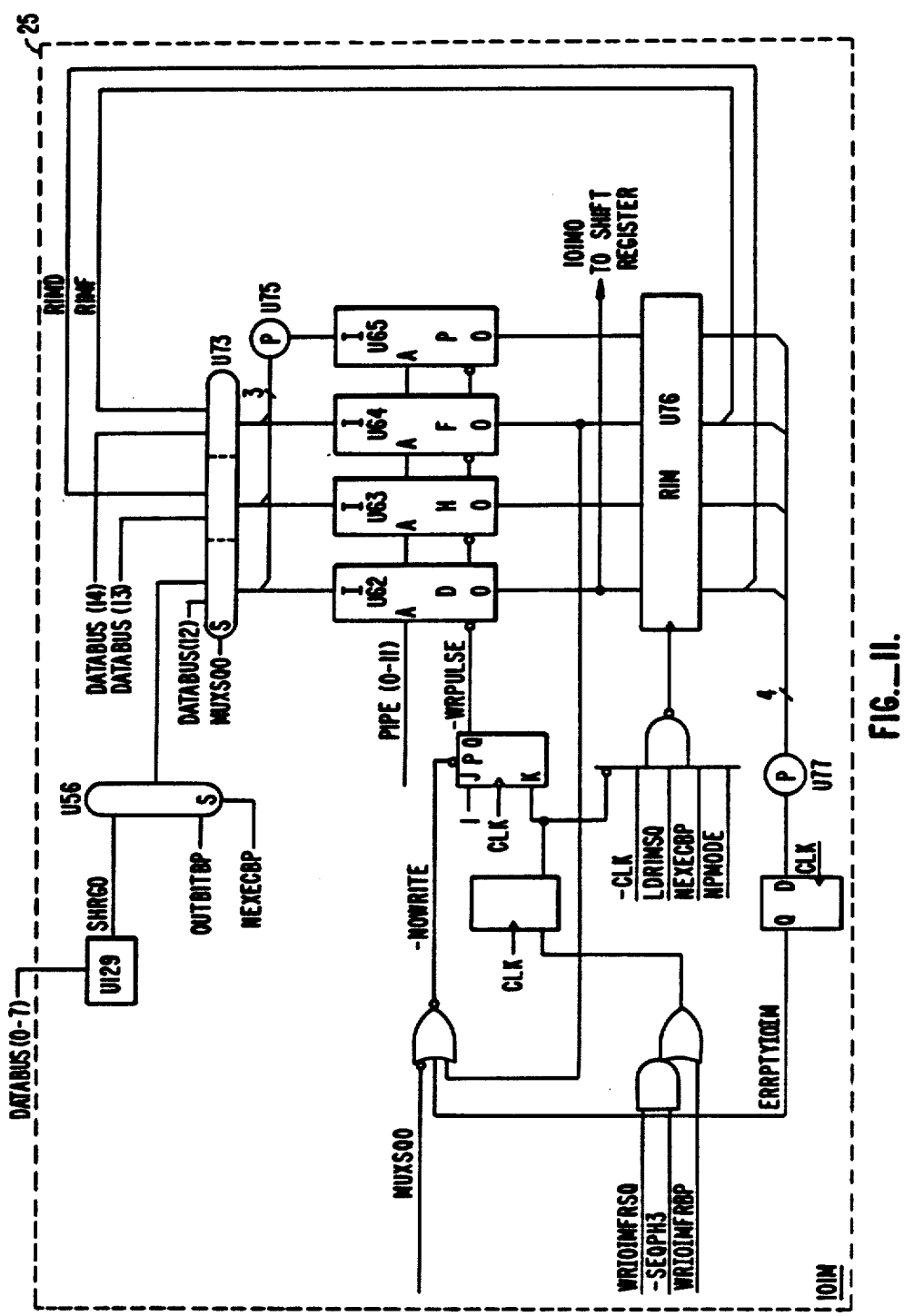
FIG.—11.

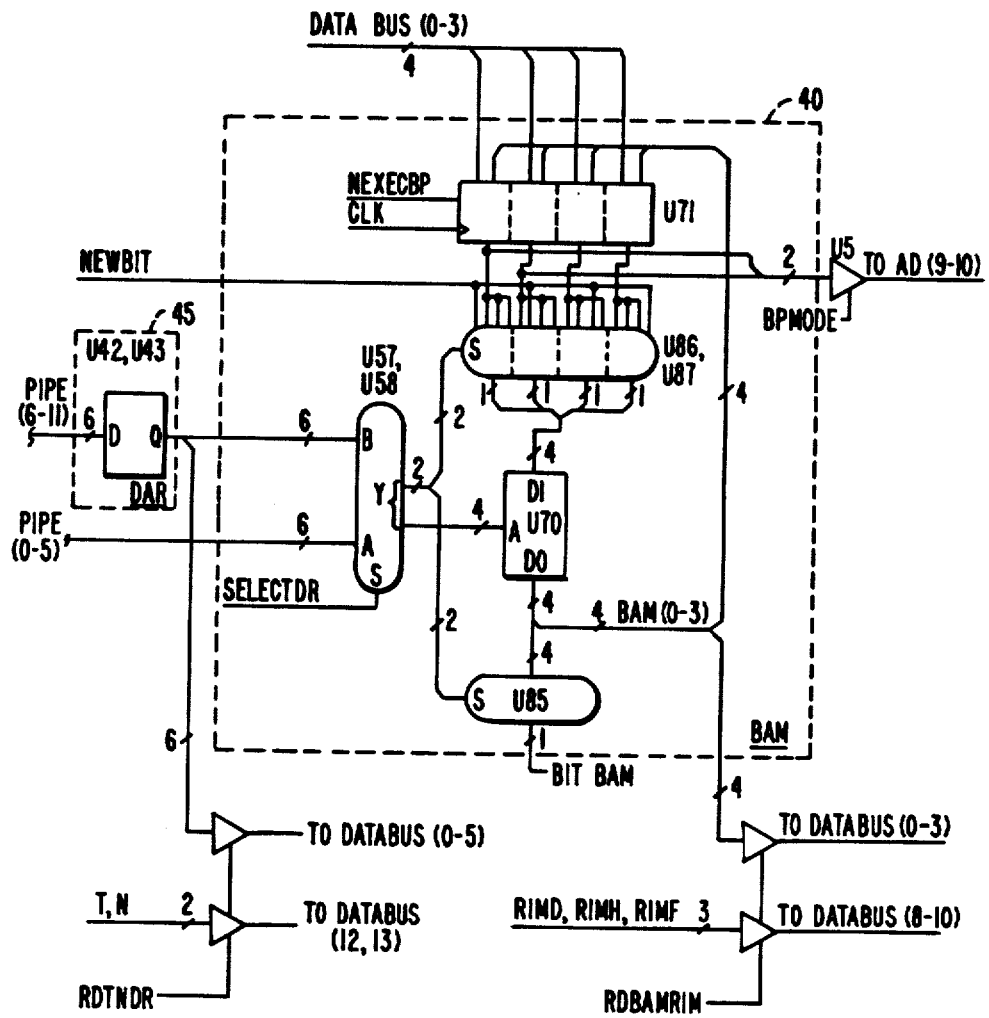
FIG._12.

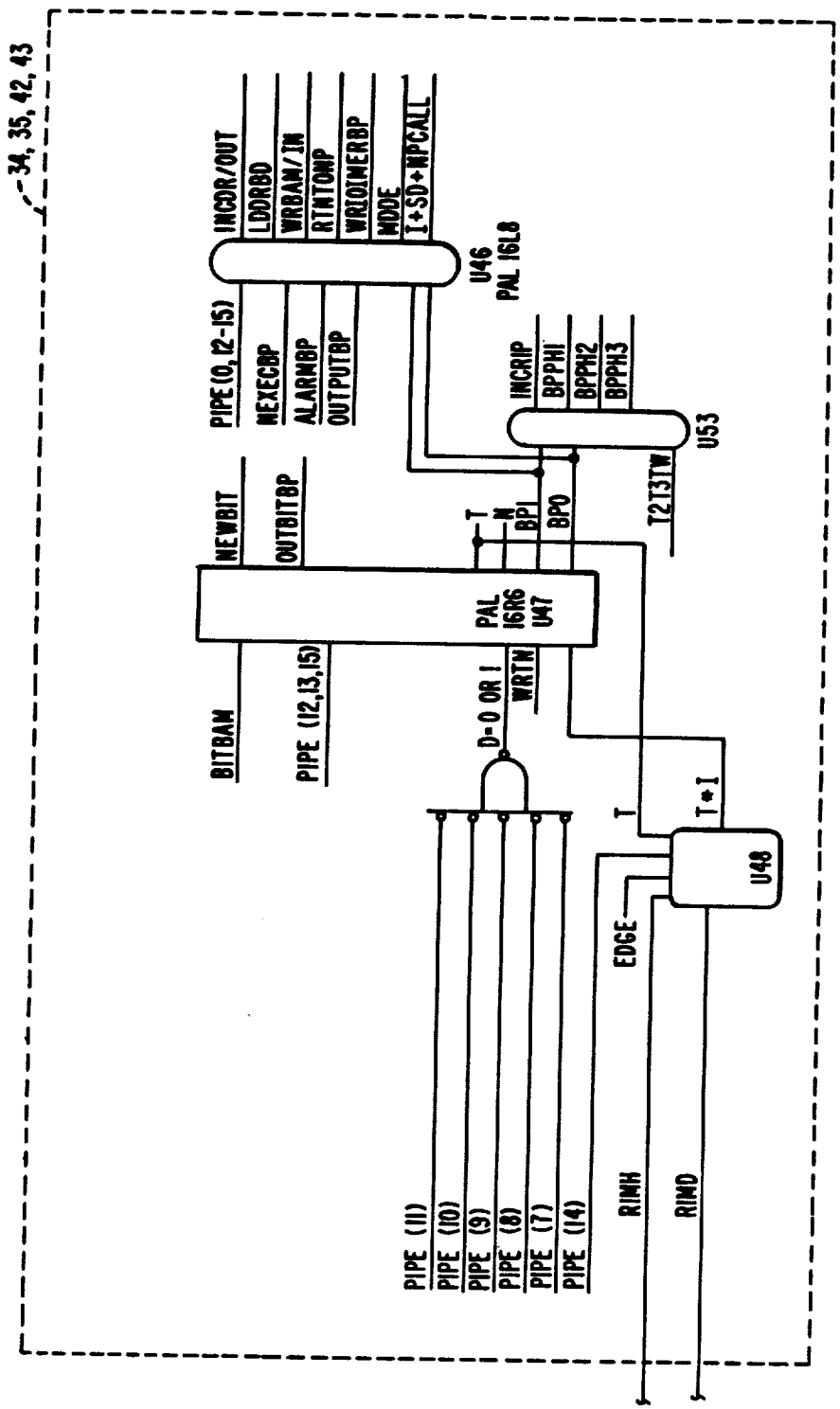
FIG.—13.

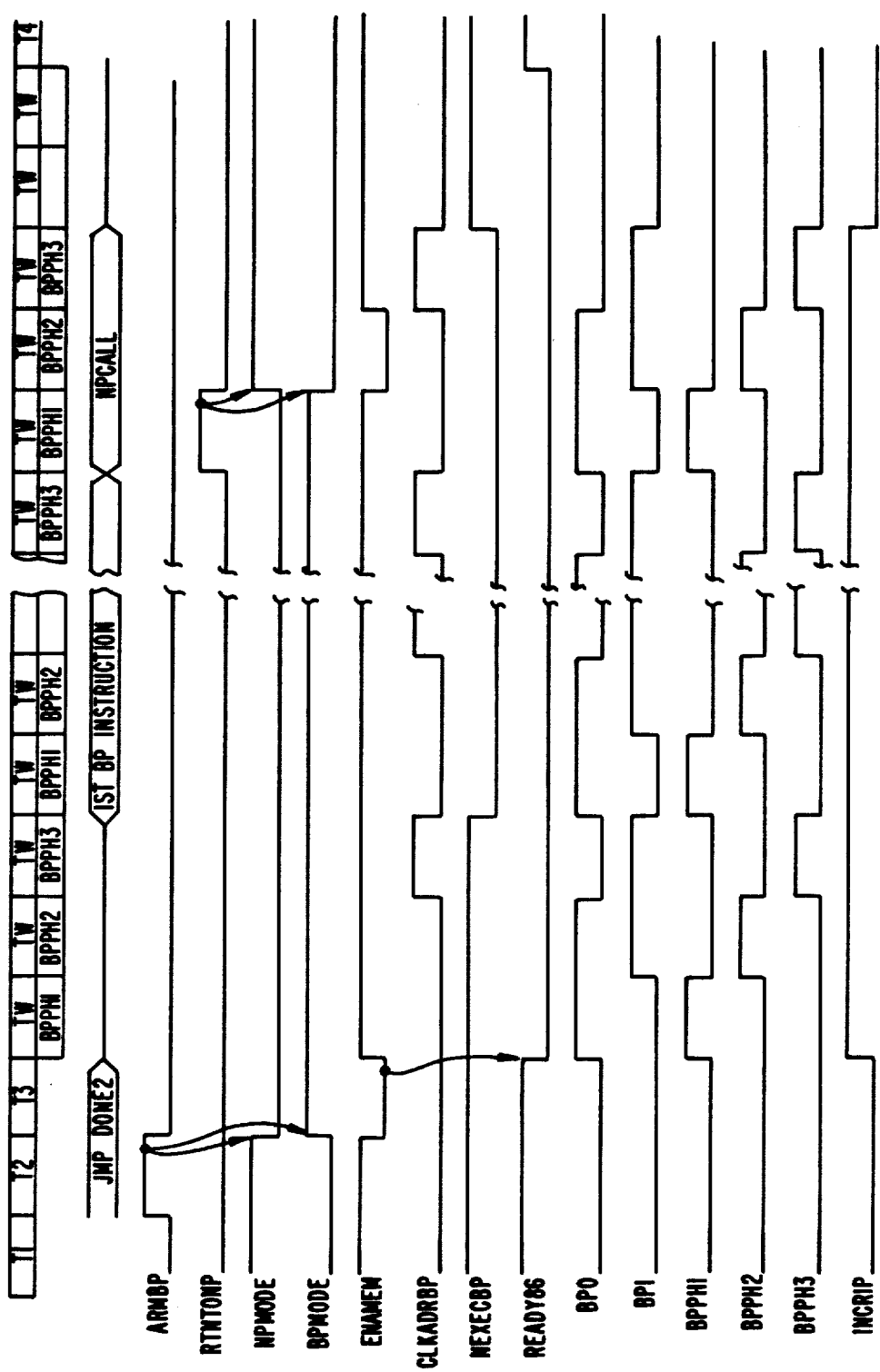
FIG._14.

BOOLEAN PROCESSOR FOR A PROGRAMMABLE CONTROLLER

A microfiche appendix comprising a single microfiche having a total of 23 frames is filed herewith.

FIELD OF THE INVENTION

The present invention relates generally to the automation of industrial processes, and more specifically to an improved programmable controller.

BACKGROUND OF THE INVENTION

It has become well-known practice to automate industrial processes by the use of a special purpose computer known as a programmable controller ("PC" - Table 1 lists this and other abbreviations used in the text). The PC periodically scans input variables from the process, performs suitable logical manipulations on the inputs and updates output variables for the process.

Reduced to bare essentials, the industrial process may be regarded as having a number of sensors and drivers. The sensors provide input values representative of the state of the process at a given time; the drivers respond to output values, and thereby control various aspects of the process. Some of the inputs and outputs are binary, corresponding to limit switches, relay contacts, proximity switches and the like, while others may be numeric, corresponding to temperatures, pressures, positions, and other physical parameters that characterize the process being controlled. However, it may be assumed that suitable interface modules have been provided so that the inputs and outputs appear to the PC as simple binary or 16-bit inputs and outputs.

Typically, there are a large number of input sensors and output drivers that must be serviced. While some large systems might have as many as 2000-4000 variables, 500 is a more representative member.

Despite the phenomenal advances in computer technology, general purpose computers are still too slow to scan the large numbers of inputs, calculate the specialized user program based on these inputs, determine the new outputs, and update the outputs for the large systems required. Accordingly, a common PC configuration comprises a special purpose computer embedded within, or in some way coupled to, a general purpose computer. The special purpose computer performs the scan cycle (reading the inputs and computing the new value of the outputs) as rapidly as possible, while the general purpose computer attends to numeric calculations for the process and communications with peripheral devices, terminals, and the like. The special purpose computer may be referred to as the "scan processor" or "scanner." Except where the distinction is important, the term "PC" will sometimes be applied to the scanner alone, and sometimes to the scanner and the general purpose computer together.

The current state of PC's reflects the prior practice of "programming" the system to be monitored and controlled by hard-wiring a representative relay logic ladder. The ladder would comprise a generally rectangular array of interconnected relay contacts and coils disposed between opposite terminals of a power supply. The state of any given relay contact would reflect the state of a corresponding switch to be monitored, and a given relay coil would control a corresponding driver to be actuated. The response time of such a system would be determined by the characteristic time for the closing of a relay, generally about 5-10 ms. The relays would often have multiple contacts to permit the corresponding input variable to be sensed at multiple places in the ladder.

In view of this historical development, programmable controllers evolved with a view to simulating such relay logic ladders. PC's are thus provided with a programming panel with which the programmer enters a graphical representation of the ladder into the computer memory. The graphical representation is then converted into some sort of internal instruction stream (i.e., is assembled or compiled) so that subsequent execution of the instructions in the stream causes the appropriate logical manipulations to be performed. The sensor and driver values are stored in a working memory, called an input/output image memory ("IOIM"), which is accessed by the PC.

While the PC clearly represents an advance over the hard-wired logic ladder, the PC cannot always match the real world in speed, especially where relays have multiple contacts. Thus, for the PC to compete on a speed basis, it should be able to complete a scan cycle in the characteristic relay response time. However, even the currently obtainable PC's are often not fast enough to scan 4000 input occurrences (perhaps corresponding to fewer than 1000 actual inputs, each of which appears at several places in the program) in 5 ms. Therefore, for subsets of inputs and outputs that must be updated at shorter intervals than that of the scan cycle, corresponding portions of the program must be executed several times during a complete scan cycle.

The scanner speed (or lack thereof) depends on two parameters, the time required for the scanner to effect one memory access, and the number of memory accesses required for the scanner to process an input variable. The first parameter may or may not depend on the particular scanner design. If the scanner operates at a speed where the memory itself is the limiting factor, the memory access time may be improved by using faster (and more expensive) memory. However, most currently available scanners do not operate at the maximum speed permitted by the memory, and so cannot be significantly speeded up merely by using faster memory.

The second parameter is a function of the assumptions built into the scanner itself, and although not well appreciated, provides a figure of merit which can be used to evaluate the scanner, regardless of the particular generation of memory devices employed.

Each scanner will have a best case program ("BCP") where the Boolean operations and structure of the program conform exactly to the assumptions designed into the scanner. Such a program requires one access per input, and represents a case where the order of input variables tells all. Only the input description (name, address, sense of complementation) is necessary to do the calculation; all else is implicit in the scanner design. While some programs can execute at this speed on a given scanner, most can't.

Each scanner will also have a worst case program ("WCP") where the assumptions of the scanner are always incorrect. For such a case, each access of the input description must be followed by another access to correctly specify the program operation and structure.

In addition to limiting speed, the assumptions built into a scanner can limit the range of programs which can be compiled. Such limitation may be viewed as operating at one or both of two levels of inflexibility.

The first level of inflexibility relates to limitations on the number of languages that can be programmed. While ladder is by far the most common language (accounting for about 80% of the PC's worldwide), some applications may best lend themselves to other representations, such as Boolean and logic diagram (referred to as "logigram"). Indeed, the prevalence of ladder may represent no more than the fact that the largest manufacturers of PC's provide machines designed to be programmed in ladder to solve ladder diagrams. However, a machine optimized for one of the languages will in general be unsuitable, or at least inefficient, for use in solving expressions or diagrams in other languages.

In Boolean, the variables are expressed as Boolean quantities, and the logical relationships are described in terms of expressions containing the logical 'AND' and 'OR' functions with nested parentheses as appropriate. In logigram, the variables are represented as logic levels or signals in a network of AND and OR gates. The ladder and logigram representations are highly structured, while the Boolean representation is considerably less so.

The second level of inflexibility relates to limitations on a scanner's ability within a particular language. For example, some prior art scanners incorporate a set of assumptions which limit the range of topological variations of ladder diagrams that may be solved. Thus, fanouts, polite crossings of wires, wrap-arounds (from the left side of the ladder back to the right side), and outputs from internal junction points may be impermissible. For such a ladder diagram to be soluble on such a scanner, the diagram must be re-drawn in an equivalent (but permissible) form by a human programmer.

In considering the design of a PC, there are a number of apparently mundane considerations that turn out to represent fairly fundamental constraints. The choice of word length is an example of this. Given that most digital logic is carried out in 8-bit multiples, a word length that is an 8-bit multiple is strongly indicated. For a PC that includes a special purpose computer operating in conjunction with a general purpose computer, some of the characteristics of the general purpose computer are imposed on the special purpose computer. This militates strongly in favor of a 16-bit word, given the current generation of microprocessors.

Once the appropriate word length is decided, the sizes of systems that must be controlled further constrain the allocation of bits within the word. Of the 16 bits, a 12-bit address field (to address 4000 contacts) may be considered to be a practical necessity, although many systems may only require 1000-2000 contacts. Even so, larger systems might require more than 4000 contacts to be addressed, thereby necessitating some sort of extended address scheme. With a 12-bit address field, the opcode has only 4 bits.

Thus, despite the normal tendency to accept the problems and limitations discussed above as inherent or inevitable, applicants have recognized the need for a programmable controller that makes efficient use of memory (for speed), may be programmed in several of the more commonly used languages, and has few limitations within a given language. Given the typical design constraints, such a PC would need a small but very powerful set of instructions to provide all the above benefits within a small opcode field.

SUMMARY OF THE INVENTION

The present invention provides a very fast and efficient scanner or Boolean processor ("BP") that is capable of compiling a full range of diagrams or expressions in each of the commonly-used languages (ladder, logic diagram (logigram), and Boolean). The BP of the present invention accomplishes this with a small but powerful instruction set that meets the design constraints imposed by requirements on the word size and address field.

The broad operation of the BP is to fetch instructions from an associated program memory, in accordance with the instructions, to sense appropriate values from IOIM, and further in accordance with the instructions, to perform logical manipulations on the IOIM values. To this end the BP includes instruction decoding means, combinatoric logic, and a number of memory elements.

The memory elements for the BP include a T-register which holds the temporary results of a sequential AND operation, an N-register which holds the initial Boolean value of T, a node memory or Binary Accumulator Memory ("BAM") which is used as a scratchpad for a program which evaluates a ladder or logigram diagram or a Boolean expression, a source address ("S") in BAM from which an initial operand is taken (and usually stored in the T-register and N-register), a destination address ("D") in BAM in which the result of an operation is stored, and a destination address register ("DAR") in which the destination address is stored.

The instruction set includes a subset of input instructions and a subset of structure instructions. The operand (I) of an input instruction is an address in IOIM. The operands (S,D) of a structure instruction are source and destination addresses in BAM. The subset of input instructions includes:

| STACK | (STK,I) |
| AND D | (AD,I) |
| AND-OR D | (AOD,I) |
| AND T | (AT,I) |

Each input instruction reads the value of a bit from IOIM and has the effect of logically combining this bit value with the value held in the T-register and possibly with the destination bit in BAM.

The BP's capability arises in part from the instruction set which includes a group of structure instructions. The structure instructions cause operation on the pair of addresses S and D, and either describe the structure of the diagram to be compiled or permit the performance of logical functions between nodes in the diagram. The subset of structure instructions includes:

| INIT | (I,S,D) |
| AND | (A,S,D) |
| OR | (O,S,D) |
| NOT | (N,S,D) |

Each structure instruction operates between a source and destination address, and has the effect of loading the destination register with the D operand and applying the S operand to the address input of the BAM in order to provide a bit which is made available to one or more of the T-register, the N-register, and the combinatoric logic.

Ladder diagrams are solved using primarily the I,S,D structure instruction, and the AT,I, and AOD,I input instructions. Each node on the diagram corresponds to a location in BAM. The ladder diagram is solved by following the power flow along the rungs between a source node and a destination node. The rung being solved is specified by beginning and ending nodes as operands to the I,S,D instruction; the effect of series contacts is accounted for by the AT,I instruction; the effect of a contact coming into a node is accounted for by the AOD,I instruction.

Boolean expressions are solved using primarily the A,S,D, the O,S,D, and the N,S,D, structure instructions, and the STK,I, the AD,I, and the AOD,I input instructions.

Logigram interpretation is carried out in a manner similar to that in ladder, where the output of each gate in the logigram representation is a node. Logigram diagrams are solved primarily using the A,S,D, the O,S,D, and the N,S,D structure instructions and the AD,I and AOD,I input instructions.

Thus, the instructions cover the elemental features of a diagram or expression to be solved, with the particular structure taken into account when the diagram or instruction is compiled. The BP hardware can therefore be relatively simple.

A further understanding of the nature and advantages of the present invention may be realized by reference to the remaining portions of the specification and attached drawings.

BRIEF DESCRIPTION OF THE DRAWINGS

FIG. 1 is a block diagram of a programmable controller ("PC") according to the present invention;

FIG. 2 is a block diagram of the Boolean processor ("BP") of the present invention;

FIG. 3 shows an example of a ladder diagram to be compiled and solved; FIGS. 4A and 4B show examples of function boxes that may be embedded in a ladder diagram;

FIG. 5 shows a logigram diagram corresponding to the ladder diagram of FIG. 3;

FIG. 6 is a simplified circuit schematic of the numeric processor ("NP") and program memory subsystems;

FIG. 7 is a timing diagram illustrating NP memory access;

FIG. 8 is a simplified circuit schematic of the sequencer subsystem;

FIG. 9 is a timing diagram illustrating sequencer operation;

FIG. 10 is a simplified circuit schematic of the pipeline register for the Boolean processor ("BP");

FIG. 11 is a simplified circuit schematic of the I/O image memory ("IOIM") subsystem;

FIG. 12 is a simplified circuit schematic of the binary accumulator memory ("BAM") subsystem;

FIG. 13 is a simplified circuit schematic of the BP logic; and

FIG. 14 is a timing diagram illustrating BP operation.

DESCRIPTION OF THE PREFERRED EMBODIMENTS

Overview and General Operation

FIG. 1 is a block diagram of a typical programmable controller system ("PC") 10 in which the present invention may be implemented. PC 10 operates to monitor and control an industrial process, and to that end, a plurality of I/O modules (not shown) are connected to actual sensors and drivers associated with the process. The modules communicate via serial and parallel buses through an I/O interface 11 with a system data bus 12 to which are also coupled a number of processors and memories. The processors include a numeric processor ("NP") 15, a sequencer 17, and a logic or Boolean processor ("BP") 20. The memories include an I/O image memory ("IOIM") 25 and a program memory 30.

As is known, some of the IOIM locations correspond to input variables from sensors, others correspond to output variables from drivers, and others correspond to program and status variables. Generally, PC 10 operates cyclically according to a cycle which includes the following:

(a) an input phase wherein IOIM 25 is updated to reflect changes sensed at the I/O modules;

(b) a processing phase wherein NP 15 and BP 20 carry out logical and arithmetic manipulations based on the input variables in IOIM 25 according to programs stored in program memory 30 and update the output variables in IOIM 25; and (c) an output phase wherein the I/O modules are updated according to newly computed values of output variables in IOIM 25.

Once the system is running, the output and input phases may be considered to form a single I/O exchange phase.

As will be more fully developed below, NP 15, sequencer 17, and BP 20 operate according to a co-processing regime wherein only one processor is operating at a given moment. When one processor is running, it fetches instructions from program memory 30. Control is passed from NP 15 to BP 20 (or vice versa), or from NP 15 to sequencer 17 (or vice versa) by special instructions embedded in the instruction stream.

In a global sense, each of the processors may be thought of as a processor that is well suited for certain tasks and not well suited for others. Thus the instruction set of NP 15 is tailored to numerical operations and operating system functions, that of sequencer 17 to I/O operations and miscellaneous control functions, and that of BP 20 to logical or Boolean operations. In this connection, it is noted that from the point of view of BP 20, sequencer 17 can be viewed as an adjunct I/O processor for NP 15.

The processors and memories are coupled to system data bus 12 through various buffers and holding registers. Addresses for NP instructions are generated in NP 15 and latched in an address latch 31. Addresses for BP instructions are set up in an instruction pointer ("IP") 32. When BP 20 is running, the BP instruction is read from memory 30 onto system data bus 12, and is held in a register 33, called the PIPE register. This allows a new instruction to be fetched from program memory 30 while the instruction in PIPE register 33 is being executed.

The bulk of the discussion from this point on will deal with the manner in which BP 20 (and to a lesser extent NP 15) operate to solve diagrams in ladder or logic diagram (often called logigram) representation or solve expressions in Boolean representation. That is, the discussion will focus on the processing phase.

Boolean Processor Organization and Memory Elements

FIG. 2 is a simplified block diagram illustrating the basic organization and memory elements of Boolean processor ("BP") 20. As alluded to above, the logical or numeric states of sensors and drivers are stored as bits in IOIM 25 and are manipulated by BP 20. The programs executed by BP 20 correspond to the particular ladder or logigram diagram or Boolean expression to be solved. Prior to execution, a diagram or expression will have been compiled to generate an instruction stream in program memory 30. During execution, BP 20 fetches instructions from program memory 30, as addressed by IP 32.

In the preferred embodiment, the instruction fetched from program memory 30 is a 16-bit word comprising a 4-bit opcode field and a 12-bit operand field which has different significance for different types of instructions. While a complete description of the instruction set and the manner in which diagrams and expressions are compiled will be set forth below, it suffices at this point to note that instructions belong to one of four classes: input, structure, mode, and NPCALL. The two main types of instructions used to execute ladder, logigram, or Boolean representations are input instructions and structure instructions.

BP 20 includes an opcode decoder 34 with combinatoric logic 35, and a number of memory elements. The memory elements include a binary accumulator memory ("BAM") 40, a T-register 42, an N-register 43, and a destination address register ("DAR") 45. The operands (S,D) of a structure instruction are a 6-bit source address in BAM 40 from which an initial operand is taken and a 6-bit destination address in BAM 40 in which the result of an operation is stored. The operand (I) of an input instruction is a 12-bit address in IOIM 25 from which an input variable (an "IOIM bit") is taken.

Broadly, the locations in BAM 40 correspond to nodes on the diagram or Boolean values at different levels in a stack being executed. A given location in BAM 40 will sometimes be denoted BAM(N) where N is the address of the location. T-register 42 holds the temporary result of sequential AND operations. N-register 43 holds the initial Boolean value of the T-register content. Sometimes the contents of T-register 42 and N-register 43 will simply be denoted T and N, respectively.

The discussion will often utilize the usual convention where $<X>$ denotes the content of X. Thus, $<DAR>$ is the content of DAR 45 which is an address in BAM 40, and $<<DAR>>$ is the content of that address in BAM which is a value (bit) in BAM (a "BAM bit"). For reasons that will appear below, the first two locations in BAM 40 are initialized to 0 and 1. Thus $<0>=0$ and $<1>=1$.

The execution of an input instruction entails the logical combination of an IOIM bit with one or more of T and a BAM bit. When opcode decoder 32 determines that the instruction fetched from program memory 30 is an input instruction, the 12-bit address field is communicated to address inputs of IOIM 25 whereupon the addressed bit is communicated to combinatoric logic 35. Opcode decoder 34 provides appropriate control signals to combinatoric logic 35 so that the newly provided input is appropriately combined with other variables.

The structure instructions operate on the pair of address S and D, and either describe the structure of a diagram to be compiled or permit logical functions to be performed between nodes on the diagram. When a structure instruction is fetched from program memory 30, the 6-bit source address S is communicated to address inputs of BAM 40 while the destination address D is loaded into DAR 45 for later communication to the address inputs of BAM 40. When the source address is provided at the address inputs of BAM 40, the addressed bit is made available to one or more of T-register 42, N-register 43, and combinatoric logic 35. In most cases, when the content of DAR 45 is applied to the address inputs of BAM 40, the addressed bit is supplied to combinatoric logic 35 or overwritten with the result of a logical combination.

Mode instructions are used for edge (change of state) detection of input variables and transfers from BAM 40 to IOIM 25 (to update variables corresponding to output coils). For certain embodiments, mode instructions permit extension of the address space.

The NPCALL (Numeric Processor CALL) instructions provide for communication between BP 20 and NP 15, the latter of which provides communications beyond BP 20. Except for some initializing and state-saving data paths, NP 15 and BP 20 communicate through BAM 40 and the NPCALL instruction. Upon decoding an NPCALL instruction, BP 20 halts and passes control to NP 15 at the address specified by the NPCALL instruction. The address is vectored through 2 bits of BAM 40, so that the specified NPCALL is entered at one of four addresses, depending upon the 2 bits as addressed by DAR 45. The purpose of this four-way vector is a fast test of the contents of BAM 40 so that numeric operations invoked by the NPCALL, and whose particular operation depends upon the contents of BAM, can execute more rapidly.

The particular sequence of operations and transfers in Boolean processor 20 may best be understood in connection with the following detailed description of the instruction set.

Boolean Processor Instruction Set

An instruction fetched from program memory 30 belongs to one of four classes, input, structure, mode, and NPCALL.

The input instructions have a bit allocation as follows:

| 15 14 | 13 12 | 11 10 9 8 7 6 5 4 3 2 1 0 |
|---|---|---|
| 1 C | F | A |

A is a 12-bit address field which represents an address in IOIM 25. The actual portion of the field that is used varies according to particular implementations, and in fact the addressable space may actually be extended by use of the mode instructions to be discussed below.

C is a 1-bit field specifying the Boolean sense of the input variable. If there was no preceding mode instruction, C has the following effect on I:

| C | OPERAND |
|---|---|
| 0 | I = $<A>$ |
| 1 | I = /$<A>$ |

If the preceding instruction specified the edge detection mode, C has the following effect.

| C | OPERAND |
|---|---|
| 0 | I = rising edge of $<A>$ |
| 1 | I = falling edge of $<A>$ | where I is the value to be passed to combinatoric logic 35.

F is a 2-bit field specifying the particular input instruction to be executed. The effect of the input instructions may be summarized as follows (D is the address in BAM 40 currently specified by destination register 45):

| NAME | F | MNEMONIC | OPERATION |
|---|---|---|---|
| STACK | 00 | STK,I | $<D+1> \leftarrow T * I$<br>$D \leftarrow D +(\text{plus}) 1$<br>$T \leftarrow N$ |
| AND D | 01 | AD,I | $<D> \leftarrow <D> * T * I$<br>$T \leftarrow N$ |
| AND-OR D | 10 | AOD,I | $<D> \leftarrow <D> +(\text{OR}) T * I$<br>$T \leftarrow N$ |
| AND T | 11 | AT,I | $T \leftarrow T * I$ |

The STACK instruction increments the contents of DAR 45, AND's the contents of T-register 42 and the addressed input variable, stores the result in the BAM location having the newly incremented address, and stores the content of N-register 43 in T-register 42.

The AND D instruction AND's the input variable, the contents of T-register 42, and the content of the BAM location pointed to by DAR 45, stores the result back in the BAM location, and stores the content of N-register 43 in T-register 42.

The AND-OR D instruction AND's the addressed input variable and the content of T-register 42, OR's this result with the content of the BAM location pointed to by DAR 45, stores the result back in the BAM location, and stores the content of N-register 43 in T-register 42.

The AND T instruction AND's the addressed input variable and the content of T-register 42, and stores the result back in T-register 42.

The structure instructions have a bit allocation as follows:

```
 15 14 13 12 11 10 9 8 7 6 5 4 3 2 1 0
|  0  1 |  F  |     D     |     S     |
```

S is a 6-bit field specifying the address of the bit in BAM 40 which is used as the source bit for the current structure instruction.

D is a 6-bit field specifying the address of the destination bit in BAM 40 for the current structure instruction and the new value to be stored in DAR 45 for subsequent input instructions.

As mentioned above, the values of BAM addresses 0 and 1 have special meaning. The power-up initializing sequence always stores a zero value in BAM(0) and a one in BAM(1).

F is a 2-bit field specifying the particular structure instruction to be executed. The effect of the structure instructions may be summarized as follows:

| NAME | F | MNEMONIC | OPERATION |
|---|---|---|---|
| INIT | 11 | I,S,D | If D=0 or 1:<br>no change of $<D>$<br>no change of $<DAR>$<br>$N \leftarrow <S>, T \leftarrow <S>$<br>If D$\neq$0 or 1:<br>$<D> \leftarrow 0$<br>$<DAR> \leftarrow D$<br>$N \leftarrow <S>, T \leftarrow <S>$ |
| AND | 10 | A,S,D | If D=0 or 1:<br>no change of $<D>$<br>no change of $<DAR>$<br>$N \leftarrow 1, T \leftarrow 1$<br>If D$\neq$0 or 1:<br>$<D> \leftarrow <D>*<S>$<br>$<DAR> \leftarrow D$<br>$N \leftarrow 1, T \leftarrow 1$ |
| OR | 01 | O,S,D | If D=0 or 1:<br>no change of $<D>$<br>no change of $<DAR>$<br>$N \leftarrow 1, T \leftarrow 1$<br>If D$\neq$0 or 1:<br>$<D> \leftarrow <D> + <S>$<br>$<DAR> \leftarrow D$<br>$N \leftarrow 1, T \leftarrow 1$ |
| NOT | 00 | N,S,D | If D=0 or 1:<br>no change of $<D>$<br>no change of $<DAR>$<br>$N \leftarrow 1, T \leftarrow 1$<br>If D$\neq$0 or 1:<br>$<D> \leftarrow /<S>$<br>$<DAR> \leftarrow D$<br>$N \leftarrow 1, T \leftarrow 1$ |

All structure instructions initialize N-register 43 and T-register 42 (to the source bit in BAM for INIT and to 1 for the other three instructions). However, the operation is different depending on the value of D. If D is 0 or 1, the structure instructions do not change the destination bit in BAM 40 or the content of DAR 45.

Where the destination address is neither 0 nor 1, the destination address D is loaded into DAR 45 and the destination bit in BAM is overwritten. INIT zero's the destination bit in BAM; AND AND's the source bit and the destination bit and overwrites the destination bit with the result; OR OR's the source bit and the destination bit and overwrites the destination bit with the result; and NOT complements the source bit and overwrites the destination bit with the result.

The mode instructions have a bit allocation as follows:

```
 15 14 13 12 11 10 9 8 7 6 5 4 3 2 1 0
|  0  0  0  0 |     P     |     M     |
```

P is a 6-bit field defining the parameter, if any, of the mode instruction.

M is a 6-bit field specifying the mode to be effected, as summarized below:

| M | OPERATION |
|---|---|
| 00XX00 | NOP |
| 00XXX1 | OUTPUT |
| 00XX10 | EDGE |

The NOP (no operation) instruction is executed without any effect. The state of BP 20 remains the same, except that IP 31 is incremented.

The EDGE mode instruction has effect only if the following instruction is an input instruction. In such a case, the operand of the input instruction (which is an address in IOIM 25) is edge detected. An edge-detected input variable is true only for a scan cycle in which the input variable changed its value relative to its value during the previous scan cycle. The sense of the transition that is significant is determined by the C field in the input instruction. The EDGE instruction affects only the next instruction in sequence so that if the EDGE instruction precedes two contiguous input instructions, only the first is affected.

The OUTPUT mode instruction operates to transfer variables from BAM 40 to IOIM 25 according to parameters in the OUTPUT instruction itself and in a list of words immediately following. The OUTPUT instruction and its output list have a bit allocation as follows:

```
       15 14 13 12 11 10 9 8 7 6  5 4 3 2 1 0
       | 0  0  0  0 |     S     | 0 0 X X X 1 |
List:  | 0 | N | T |            A              |
       | 0 | N | T |            A              |
                        . . .
       | 1 | N | T |            A              |
```

The words following the output instruction, up to and including the first appearance of a "1" in bit(15), form the output list. The extent of the output list is defined by bit(15), and the output mode instruction transfers variables from BAM 40 to IOIM 25 so long as bit(15) is 0.

S is a 6-bit field specifying the address of the bit in BAM 40 that is to be used as a source of the value to be written into IOIM 25. If S is 0 or 1, the register into which S is normally loaded is not loaded.

N is a 1-bit field specifying the value of the increment to be automatically added to the current effective value of S prior to execution of this list entry. Where N=0, the source bit for this word of the output list will be taken from the same BAM address as the current source address. In typical practice, the first entry in the output list has N=0 so that the source operand is taken from the BAM location as specified by the S-field of the OUTPUT mode instruction. Subsequent list entries may have N=0 or N=1. The effect of subsequent entries with N=0 is to write the same BAM bit into more than one IOIM location to effect exactly parallel outputs. Where N=1, the effect is to sequence through BAM 40, starting at the initial source location, and transferring bits to IOIM 25 in the order found in BAM 40. The last output instruction leaves the contents of DAR 45 equal to the address of the last BAM access.

A is a 12-bit field specifying the destination address in IOIM 25 to which the BAM source bit is to be transferred. The contents of the BAM source bit are not altered by the transfer. The A-field gives the output list the effect of a map from BAM to IOIM.

T is a 2-bit field specifying the type of output according to the following code:

| T  | OPERATION                | EFFECT                       |
|----|--------------------------|------------------------------|
| 00 | combinatoric -( )-       | <A>←<BAM>                    |
| 01 | inverted combinatoric -(/)- | <A>←/<BAM>                |
| 10 | set latch -(R)-          | <A>←<A>*/<BAM>               |
| 11 | reset latch -(S)-        | <A>←/<A>*<BAM>               |

As alluded to above in connection with the description of the input instructions, the addressable space may be extended beyond the bounds of the 12-bit address field of the input instructions and output list. For those embodiments wherein such extension is possible, the mode (M) field is as follows:

| M      | OPERATION              |
|--------|------------------------|
| 00X000 | NOP                    |
| 00X001 | OUTPUT                 |
| 00X010 | EDGE DETECT            |
| 00X011 | OUTPUT                 |
| 000100 | EXTEND                 |
| 000101 | EXTEND and OUTPUT      |
| 000110 | EXTEND and EDGE DETECT |
| 000111 | EXTEND and OUTPUT      |
| 001100 | PAGE                   |
| 001101 | PAGE and OUTPUT        |
| 001110 | PAGE and EDGE DETECT   |
| 001111 | PAGE and OUTPUT        |

If the subsequent instruction is an input instruction, bit(6) of the extend instruction is taken as bit(12) of the address field (A) of the input instruction. The effect is to override the default IOIM page for the duration of the immediately following input instruction only, and extend the IOIM address field to 13 bits. If the following instruction is not an input instruction, the extend instruction acts as a NOP.

For the PAGE instructions, the IOIM page is set to the value of the single-bit parameter P which occupies bit(6) of the PAGE instruction. The page remains selected until changed by another page instruction. At power up the page is initialized to 0. The page instruction is the only interruptible multiword mode instruction. Therefore, the selected page value is considered to be part of the machine's state and is updated by NPCALL instructions which save and restore state.

Each of the NPCALL instructions and its parameter list have a bit allocation as follows:

```
       15 14 13  12 11 10 9 8 7 6 5 4 3 2 1 0
       | 0  0  1 | X X X |        S        |0|
List:  |              P1                     |
       |              P2                     |
                       . . .
       |              Pn                     |
```

An NPCALL instruction signifies, in effect, a subroutine call to numeric processor 15. Control passes from BP 20 to NP 15, and resumes in BP 20 at the instruction immediately following the parameter list formed by the words immediately following the NPCALL instruction. The length of the list is implicit in the NPCALL.

S is a field of 8-9 bits specifying the unique name of the NP subprogram. The least significant 2 bits of the contents of what is pointed to by DAR 45 are prefixed to S to form a transfer vector into a table of subprogram entry addresses. As will be described below, BAM 40 is treated as if it were addressable as 4-bit nibbles, even though the actual hardware is not necessarily implemented as 4-bit memory. Therefore, <<DAR>> is always aligned on a nibble boundary and object code is always compatible. Where vectoring is not used by a subprogram, table entries are identical.

The parameters are 16-bit fields interpreted by the specific routine invoked by the NPCALL instructions. Any number of immediate parameters can be passed by the parameter list with indirection and indexing left to the interpretation.

There are two uses of NPCALL instructions. One is to gain access to the operating system subroutines such as I/O drivers, task schedulers, and the like. Such NPCALL instructions are inserted by the compiler and invisible to the user. The second use is as a "function box" in ladder or logigram languages. These are packaged subroutines that the system makes available to the user.

Solution Of Ladder Diagrams

Ladder language is the most common language in use, currently representing on the order of 80% of the worldwide market. It is a two-dimensional graphic language showing power flow from left to right across the screen, and represents Boolean variables corresponding to relay contacts (which may be normally open or normally closed). A relay contact may be edge detected in the sense that its corresponding Boolean variable is true for the first scan cycle following a change in state.

FIG. 3 shows an example of a ladder diagram to be solved. Power flow is imagined to occur from a left or power rail 50 to a right or ground rail 55 through a network comprising a generally rectangular array of input contacts designated I1–I9, the states of which determine the status of an output relay designated O1. In this particular example, input contacts I2 and I5 are normally closed contacts while the remaining input contacts are normally open. The points at which branching paths converge or diverge are called nodes, and are designated N2–N4 (N1 is reserved for the left rail).

Thus, in this example, power will flow from N1 to N2 if either: (a) I1 and I3 are energized to close the normally open contacts while I2 remains unenergized to leave the normally closed contacts closed; or (b) I6 and I7 are energized to close the normally open contacts. Power will flow from N2 to N3 if I4 is energized to close the normally open contact. Similarly, power will flow from N3 to N4 (and thus to output coil O1) if either: (a) I5 remains unenergized to leave the normally closed contact closed; or (b) I8 and I9 are both energized to close the normally open contacts.

A ladder diagram is compiled into an instruction stream that may include any or all of the following structure and input instructions:

structure: INIT
input: AND-OR D
   AND T

NPCALL and mode instructions are used for function boxes, outputs, and unusual cases.

The compiler must recognize the ladder structure which is characterized by the nodes (a node being a union of two circuits). A node becomes a destination value in BAM, with computation being done which continuously modifies the node value until all input circuits to the node have been taken into account.

The ladder of the worst possible complexities requires two instructions per contact: one input instruction to name the contact and account for its logical effect, and one structure instruction to define the node and branch structure adjacent to the contact. The structure instruction is executed first. Very few ladders require an average of two instructions per contact—1.1 or 1.2 instructions per contact is typical. Thus, the BP of the present invention is very efficient.

The BP's interpretation of the Ladder can be defined by translating structural elements to their object code.

The Ladder can start in one of three ways:

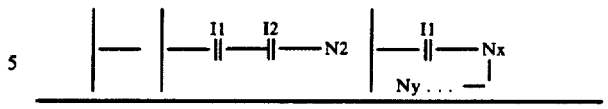

The left-most has the effect of extending the left rail toward the right, and no object code is compiled (i.e., null inputs require no code). The middle case is two inputs in series, whereupon the compiler generates code to do the following:

$<T> \leftarrow S$ (1) by definition
$<T> \leftarrow <T> * I1$
$<2> \leftarrow <T> * I2$ The right-most is a contact followed by a node, Nx, whereupon the compiler generates code to do the following:

$<x> \leftarrow <1> * I1$
$<x> \leftarrow <x> + f<y>$ where $f<y>$ is some Boolean function of Node y and the contacts between Node x and Node y.

Some general compiling rules for ladder may be summarized as follows:

1. The evaluation of a node is started with an INIT structure instruction with the destination address being the node being evaluated, and the source address being the node upstream whose effect must be accounted for. An exception is that if the node has already been partially evaluated, the destination address should be 0 since the INIT will then load T and N with $>S>$ without destroying the already partially calculated node.

2. Series contacts are done with an AND T input instruction.

3. Series contacts are finished with an AND-OR D input instruction.

4. Another parallel group of series contacts is done repeating steps 2 and 3.

5. Only one contact (in series) is done with an AND-OR D input instruction.

Using the above rules, the ladder diagram of FIG. 3 is compiled into and solved by the following code.

| INSTRUCTION | | EFFECT |
|---|---|---|
| (str.) | INIT : 1,2 | $S=1, D=2, <2> \leftarrow 0, (<S>=1),$ $T \leftarrow <S>, N \leftarrow <S>$ |
| (inp.) | AND T : I1 | $T \leftarrow T * I1$ |
| (inp.) | AND T : /I2 | $T \leftarrow T * /I2$ |
| (inp.) | AND-OR D : I3 | $<2> \leftarrow <2> + T * I3,$ $T \leftarrow N$ |
| (inp.) | AND T : I6 | $T \leftarrow T * I6$ |
| (inp.) | AND-OR D : I7 | $<2> \leftarrow <2> + T * I7$ |
| (str.) | INIT : 2,3 | $S=2, D=3, <3> \leftarrow 0$ $T \leftarrow <S>, N \leftarrow <S>$ |
| (inp.) | AND-OR D : I4 | $<3> \leftarrow <3> + T * I4$ |
| (str.) | INIT : 3,4 | $S=3, D=4, <4> \leftarrow 0$ $T \leftarrow <S>, N \leftarrow <S>$ |
| (inp.) | AND-OR D : /I5 | $<4> \leftarrow <4> + T * /I5,$ $T \leftarrow N$ |
| (inp.) | AND T : I8 | $T \leftarrow T * I8$ |
| (inp.) | AND-OR D : I9 | $<4> \leftarrow <4> + T * I9$ |

The first six instructions evaluate Node 2 and store the result in BAM(2). The operation of this object code will now be discussed.

The INIT structure instruction tells BP 20 what nodes to work with: the source is Node 1 (always initialized by the operating system to be 1, it serves as the left rail); the destination is Node 2. The INIT instruction clears the value of destination Node 2 to 0 and initializes N-register 43 and T-register 42 with the value of the source node which in this case is a "1".

The first ANDT input instruction AND's T-register 42 (the source node value) with the input (I1) and stores the result back in T. The next ANDT instruction does the same for the next input (I2), but with the complement of the value of I2, so that now T=I1*/I2. Thus, it can be seen that T stores the results of a series connection of inputs.

The AND-OR D instruction does several things. First, it OR's the AND of T and the input (I3) with the existing value of the node (which is zero from the INIT instruction), whereupon the value of the upper series branch between Node 1 and Node 2 has been calculated. Next, so that the value of the lower series branch may be calculated, T is reinitialized with the value of S which had been stored in N by the INIT instruction. The use of N in this manner eliminates the need for a separate source register, plus the access of its value which would take a memory cycle.

The next AND T instruction AND's T (the Source node value) with the input (I6), and stores the result in T. The next AND-OR D instruction finishes the node by making <D> equal to (I1*/I2*I3)+(I6*I7).

Node 3 is evaluated next with two instructions, one to set up the S and D, and one to evaluate the effect of input I4. Node 4 is evaluated in essentially the same way as Node 2.

It should be noted that compiling ladder diagrams uses the upper-left rule where the upper-most and left-most contacts are evaluated first. This allows the user to know the order in which the source code will be evaluated, and makes it possible to recreate the ladder diagram from the object code. However, a ladder reconstructed from the code will not look exactly like the ladder of FIG. 3. For example, while I7 is underneath I2 in FIG. 3, there is no way to know from the compiled code whether to place I7 under I2 or I3. Nevertheless, stored "decompiling aids" which describe any deviation from the upper-left rules may be used to allow exact reconstruction of the ladder diagram as the user defined it.

FIG. 4A shows a simple function box, namely a timer T15, which may be implemented by a subroutine call (NPCALL) to NP 15. Timer T15 has C (countdown or time) and E (enable) inputs and D (done) and R (running) outputs. Associated with timer T15 are a preset value and a timer register. The timer operates by counting down the timing register when the E and C inputs are true. When the E input is false, the timing register is forced to the preset value. The D output is true when the timer has counted its timing register down to zero. The R output is true when the timer register is non-zero and both C and E inputs are true, that is, while timer T15 is running.

Each timer present in the system has an associated 4-word sublist in a timer list within a common data segment in program memory 30. The first word of the sublist includes the most recent values of C, E, D, and R, and a field specifying the time base (10 milliseconds, 100 milliseconds, 1 second, or 1 minute) which is fixed at program time. The second word is the preset value. The third word is the timer register value. The fourth word is a link list pointer which links the sublists of all timers operating on the same time base that are running. The pointer is zero when the corresponding timer is not running.

System-wide timing is carried out by a system routine which is invoked by an interrupt every millisecond. The routine determines which time base is to be serviced, and operates on the linked list of timers operating on that time base. The routine decrements the timer register value in the sublist of each timer that is running on that time base. In the event that the register value reaches zero, the subroutine removes that sublist from the linked list by zeroing the pointer.

The actual timer operation is invoked by a call to a function box subroutine corresponding to the particular type of timer, with the subroutine parameter being the address of the sublist for the particular timer. This may occur once each scan cycle, or more often, depending on the program. Prior to calling the function box subroutine, BP 20 executes the code necessary to evaluate C and E and place them in BAM locations on a nibble boundary, that is, starting at a BAM location whose address is 0 (modulo 4). The subroutine call (NPCALL instruction) causes NP 15 to commence execution. The BAM locations counting the C and E values are communicated to NP 15 on system data bus 12, and the subroutine determines whether C or E has changed in a manner that dictates starting or stopping the timer. If so, the subroutine invokes a system routine that links or unlinks the sublist, as the case may be. The D and R outputs are evaluated, the values of C, E, D, and R are updated in the sublist, the subroutine writes the outputs in the BAM locations previously occupied by the inputs, and control is passed back to BP 20.

For the particular example, assume that the C and E inputs are to be set up at nodes 8 and 9. The following code will implement the diagram in FIG. 4A.

```
(str.)  INIT   : 1,8
(inp.)  AND D  : I1
(str.)  INIT   : 1,9
(inp.)  AND D  : I2
(npc.)  NPCALL TMR1
```

It is noted that the values in nodes 8 and 9 provide the actual operating values for the subroutine, but also allow one of four entry points, depending on these values, to be chosen.

FIG. 4B shows a function box for an up-down counter C10. Counter C10 includes U (up), D (down), P (preset), and R (reset) inputs, and D (done), E (underflow), and F (overflow) outputs. Associated with counter C10 are a preset value and a counter register (counter content).

Upcounting occurs when the value of U changes from zero to one. Downcounting occurs when the value of D changes from zero to one. The P input causes the counter register to assume the preset value; the R input causes the counter register to be set to zero. The F output is true if the counter is counted above 9999 (to zero); the E output is true if the counter is counted below zero (to 9999). The D output is true if the counter reaches its maximum value of 9999.

As in the case of the timer of FIG. 4A, counter C10 has a sublist in a counter list within the common data segment. However, the counter list is not linked as in the case of the timer list since the list need only be accessed when the counter function box subroutine is called.

Solution of Logic Diagrams (Logigram)

Logigram is a two-dimensional graphical language nearly identical to the logic schematic used by digital design engineers. FIG. 5 shows a logigram representation of the same system as shown in the ladder diagram of FIG. 3. In this case, series combinations of contacts are represented by AND gates having the corresponding variables as inputs, while the flow of alternate branches into a node is shown as an OR gate. It should be noted that there exist other logigram representations equivalent to that shown in FIG. 4.

A logigram diagram is compiled into an instruction stream that may include any or all of the following structure and input instructions:

```
structure : NOT
            AND
            OR
    input : AND D
            AND-OR D
```

NPCALL and mode instructions are used for flip-flops, counters, timers, and the like.

The compiler uses the nodes as part of a structure, much like in ladder, except that the output of each "gate" is a node.

Some general compiling rules for logigram may be summarized as follows:

1. An inverter is implemented by using the NOT structure instruction with the source being the input node and the destination being the output node.

2. An AND gate is implemented using first a NOT structure instruction with the source being 0 and the destination being the output node. This loads T, N, and <D> (which is the gate output) with 1. An input which is another node is handled with an AND structure instruction with the source being the input node and the destination being the output node. An input from IOIM 25 is handled with an AND D input instruction which basically ANDs <D>, T (always 1), and I. The input for the input instruction may be complemented to save inverters.

3. An OR gate is implemented using first a NOT structure instruction with the source being 1 and the destination being the output node. This loads T and N with 1 and <D> (which is the gate output) with 0. An input which is another node is handled with an OR structure instruction with the source being the input node and the destination being the output node. An input from IOIM 25 is handled with an AND-OR D input instruction which OR's <D> with the AND of T (always 1) and I.

Thus, the logigram code is very efficient with the number of instructions per gate being only one more than the number of inputs. Inversion costs only one instruction, and inversion of inputs from IOIM 25 is free due to the complementation option (C-field) of the input instructions.

Using the above rules, the logigram diagram of FIG. 4 can be compiled and solved by the following code.

```
(str.) NOT : 0,2
(inp.) AND D : I1
(inp.) AND D : /I2
(inp.) AND D : I3
(str.) NOT : 0,3
(inp.) AND D : I6
```

-continued
```
(inp.) AND D : I7
(str.) NOT : 0,4
(inp.) AND D : I8
(inp.) AND D : I9
(str.) NOT : 1,5
(str.) OR : 2,5
(str.) OR : 3,5
(str.) NOT : 1,6
(inp.) AND-OR D : /I5
(str.) OR : 4,6
(str.) NOT : 0,7
(str.) AND : 5,7
(inp.) AND D : I4
(str.) AND : 6,7
```

Circuit blocks such as timers, counters, and the like are implemented in the same way that corresponding function boxes are implemented in ladder language.

Solution of Boolean Expressions

Boolean language is a literal representation which takes the form of a character string of logical variables. For example, the Boolean representation of the systems illustrated in FIGS. 3 and 5 is as follows:

$O1 = (I1*/I2*I3 + (I6*I7))*I4*(/I5 + (I8*I9))$ where '*' has precedence over '+'. To the extent that the values of interim combinations corresponding to the nodes of FIG. 3 are relevant (as for example if there are other branches) the Boolean expressions might look as follows:

```
N2 = I1 * /I2 * I3 + I6 * I7
N3 = N2 * I4
N4 = N3 * (/I5 + I8 * I9)
O1 = N4
```

A Boolean expression is compiled into an instruction stream that may include any or all of the following structure or input instructions:

```
structure : NOT
            AND
            OR
    input : AND D
            AND-OR D
            STACK
```

In the case of Boolean, the significance of the nodes is different. The BAM "nodes" are levels of parenthesis in a Boolean "stack". As each left parenthesis is encountered, a new (higher) node is used to compile the results of the Boolean function enclosed by this left parenthesis and its associated right parenthesis.

Some general rules for compiling Boolean expressions may be summarized as follows.

1. The evaluation of a Boolean function (or subfunction) is started with a NOT structure instruction. The loading of DAR 45 with the new D, and <D> with the complement of <S> is not relevant, but the loading of T and N with 1 is.

2. A STACK input instruction (which increments DAR 45 automatically) is used for each input that does not end with a right parenthesis. This ANDs the input with T (T always 1), stores the result in the BAM location pointed to by the incremented DAR, and then loads T with N (which was loaded with 1 by the first NOT structure instruction).

3. A left parenthesis is ended when the right parenthesis is reached. This is done with an AND or an OR structure instruction. They "unstack" the value which has been computed for the function within the parenthesis and AND or OR it with the value in the next lower stack position. To this end, S is set to the value of the stack before unstacking, and D to the next lower value of the stack. Thus, for example, AND:3,2 (S=3 and D=2) takes the value in BAM(3), loads DAR 45 with the new value D which is 2, ANDs the value in BAM(3) with the value in BAM(2), and then store the result in BAM(2).

4. Variables on the same "stack" level are combined with the AND D and AND-OR D input instructions.

Using these rules, the expression corresponding to the diagrams in FIGS. 3 and 4 may be compiled as follows:

A subfunction such as X=(F+G)*(A+B) may be computed before the function, and stored in another part of BAM, for example, ending so that X is in BAM(30). Then to use this in a function such as OUTPUT=AX+B, code would be compiled as follows (where A and B are inputs from IOIM).

| MNEMONIC | WORKING D | CONTENTS OF BAM LOCATIONS D, . . . 2 |
|---|---|---|
| NOT: 0,2 | 2 | <1> |
| STACK: A | 3 | A |
| NOT: 30,3 | 3 | /<30>,A |
| NOT: 3,3 | 3 | <30>,A |
| AND: 2,3 | 3 | (<30>)*A |
| AND-OR D: B | 3 | B+(<30>)*A |
| OUTPUT | 3 | |

| INSTRUCTION | <DAR> | CONTENT OF BAM LOCATIONS <DAR> . . . 2 |
|---|---|---|
| (str.) NOT : 0,2 | 2 | <1> |
| (inp.) STACK : I1 | 3 | I1 |
| (inp.) AND D : /I2 | 3 | /I2*I1 |
| (inp.) AND D : I3 | 3 | I3*/I2*I1 |
| (inp.) STACK : I6 | 4 | I6, I3*/I2*I1 |
| (inp.) AND D : I7 | 4 | I7*I6, I3*/I2*I1 |
| (str.) OR : 4,3 | 3 | I7*I6+I3*/I2*I1 |
| (inp.) AND D : I4 | 3 | I4*(I7*I6+I3*/I2*I1) |
| (inp.) STACK : /I5 | 4 | /I5,I4*(I7*I6+I3*/I2*I1) |
| (inp.) STACK : I8 | 5 | I8,/I5,I4*(I7*I6+I3*/I2*I1) |
| (inp.) AND D : I9 | 5 | I9*I8,/I5,I4*(I7*I6+I3*/I2*I1) |
| (str.) OR : 5,4 | 4 | I9*I8+/I5,I4*(I7*I6+I3*/I2*I1) |
| (str.) AND : 4,3 | 3 | (I9*I8+/I5)*I4*(I7*I6+(I3*/I2*I1) |
| (mode) OUTPUT : 3 | 3 | |

An example of a more complex Boolean Function is set forth below.

$$A(B(C+D(E+F(G+H)I+J(K+L)+M)+Q)+R$$

This expression is compiled into and solved by the following code.

Thus, if a subfunction is used often in a function, it may be precalculated and then using only two instructions, its sub-results may be moved into the "stack" for use. It is noted that the NOT structure instruction is used twice to get the non-inverted value.

Overview of Preferred Hardware Implementation

| INSTRUCTION | <DAR> | CONTENTS OF BAM LOCATIONS <DAR> . . . 2 |
|---|---|---|
| NOT : 0,2 | 2 | <1> |
| STACK : A | 3 | A |
| STACK : B | 4 | B,A |
| STACK : /C | 5 | /C,B,A |
| STACK : D | 6 | D,/C,B,A |
| STACK : E | 7 | E,D,/C,B,A |
| STACK : F | 8 | F,E,D,/C,B,A |
| STACK : G | 9 | G,F,E,D,/C,B,A |
| AND-OR D : H | 9 | G+H,F,E,D,/C,B,A |
| AND : 9,8 | 8 | F(G+H),E,D,/C,B,A |
| AND D : I | 8 | F(G+H)I,E,D,/C,B,A |
| STACK : J | 9 | J,F(G+H)I,E,D,/C,B,A |
| STACK : K | 10 | K,J,F(G+H)I,E,D,/C,B,A |
| AND-OR D : L | 10 | K+L,J,F(G+H)I,E,D,/C,B,A |
| AND : 10,9 | 9 | J(K+L),F(G+H)I,E,D,/C,B,A |
| OR : 9,8 | 8 | J(K+L)+F(G+H)I,E,D,/C,B,A |
| OR : 8,7 | 7 | J(K+L)+F(G+H)I+E,D,/C,B,A |
| AND : 7,6 | 6 | ((J(K+L)+F(G+H)I+E)D,/C,B,A |
| OR : 6,5 | 5 | ((J(K+L)+F(G+H)I+E)D+/C,B,A |
| AND-OR D : M | 5 | M+((J(K+L)+F(G+H)I+E)D+/C,B,A |
| AND : 5,4 | 4 | (M+((J(K+L)+F(G+H)I+E)D+/C)B,A |
| AND-OR D : Q | 4 | Q+(M+((J(K+L)+F(G+H)I+E)D+/C)B,A |
| AND : 4,3 | 3 | Q+(M+((J(K+L)+F(G+H)I+E)D+/C)B,A |
| AND-OR D : R | 3 | R+(Q+(M+((J(K+L)+F(G+H)I+E)D+/C)B)A |
| OUTPUT | 3 | |

Thus, the Boolean function can be seen to have been solved when the instruction stream is executed.

FIGS. 6-14 are simplified circuit schematics and timing diagrams of PC 10 showing a preferred embodiment of NP 15, sequencer 17, BP 20, and the associated memories and control circuits. A complete set of circuit schematics is provided in a microfiche appendix filed with this application. These include seventeen sheets relating to the processor main circuit board and four sheets relating to the program memory auxiliary circuit board.

The simplified schematics incorporate the following drawing conventions. In general, signals enter circuit elements or blocks on the left or top and exit on the right or bottom. A rectangular shape is used to indicate a memory device such as a flip-flop, latch, or register; a box with rounded corners is used to indicate a device without memory elements such as a decoder, multiplexer, or parity tree. So that the functionality and operation may be better understood, all signals are drawn in the high true sense, even though many signals are low true in the actual implementation. Therefore, a bubble on an input device or a minus sign before a signal mnemonic indicates logical negation of the state of the signal, not accommodation of a low true signal. Circuit elements or blocks are referenced with one or more designators comprising the letter "U" followed by a number. These designators correspond to the designators used on the circuit schematics in the microfiche appendix. Part types and cross-references to the sheets in the microfiche appendix are set forth in Table 2 at the end of this specification.

Although NP 15, sequencer 17, and BP 20 operate in exclusive fashion so that only one processor has control at a given time, all three have their basic timing derived from a system clock signal, designated generically CLK or GCLK, having a cycle time of approximately 135 nanoseconds. The clock signal is a series of pulses characterized by a leading edge at the beginning of the cycle and a trailing edge approximately two-thirds through the cycle.

Since the present invention is drawn to the Boolean processor (BP 20), the description of NP 15, sequencer 17, and program memory 30 will be in slightly less detail, stressing only those features that are relevant to the manner in which BP 20 fetches its instructions and passes control back and forth.

Numeric Processor Hardware and Timing

FIG. 6 is a simplified circuit schematic showing the configuration of NP 15, address latch 31, IP 32, program memory 30, and I/O interface 11.

NP 15 is preferably implemented with a pair of microprocessor chips U4 and U7. Microprocessor U4 carries out numerical computations and oversees memory and I/O functions (in concert with sequencer 17) while microprocessor U7 operates as a console communications processor which carries out timing functions and provides a terminal interface. Microprocessors U4 and U7 are coupled to a multiplexed address/data bus AD(0–15) with an additional portion A(16–19) expanded for high-order address bits only. The AD bus is a two-phase bus which carries address information in the first phase and data information in the second phase. Microprocessors U4 and U7 operate in exclusive fashion wherein the microprocessor that is not executing places its bus outputs in a high impedance state while the other microprocessor executes.

Address latch 31 operates to demultiplex the address information from the AD bus and comprises transparent latches U6, U8, and U18. The latch inputs are coupled to the AD bus and the outputs to an address bus ADDR(1–16). ADDR(1–4) are communicated to sequencer control circuitry that includes a counter U90 and a multiplexer U100. ADDR(1–4) are communicated to a first set of inputs of multiplexer U100, and through counter U90 to a second set of inputs of multiplexer U100. The multiplexer outputs ADDRSQ(1–4) provide the low-order four bits while ADDR(5–16) provide the high-order twelve bits used to address program memory 30.

IP 32 is an incrementable, parallel loadable register that includes a counter (U87, U88, U98, U99) and a buffer (U89, U107). The counter has inputs coupled to system data bus 12 (designated DATABUS(0–15)) and outputs that drive the ADDR lines through the buffer. In operation, NP 15 loads IP 32 prior to passing control to BP 20, whereupon IP 32 serves as the instruction pointer for BP 20. Thus, when control passes, IP 32 points into program memory 30 so that instructions may be fetched and made accessible to BP 20. It is noted the data for BP 20 are stored in IOIM 25 and BAM 40, not in program memory 30.

Program memory 30 includes RAM (U150,U151), ROM (U152,U153,U154,U155), and cartridge elements whose data outputs (and inputs as appropriate) are coupled to a local memory bus MEMBUS(0–15) which is coupled to system data bus 12 through a bidirectional bus transceiver (U115, U122). Instructions and data operands are gated through transceiver (U115, U122) in strobed fashion. The use of such a local memory bus is necessitated by the low electrical drivability of the memory elements.

System data bus 12 ties the functional aspects of the programmable controller together and provides a pathway for communication between them. The multiplexed AD bus is coupled to system data bus 12 through a bidirectional bus transceiver (U3, U16, U17) which gates information in a strobed fashion. This information includes instructions fetched from main memory for microprocessors U4 and U7, data operands from main memory, and other operands from IOIM 25, BAM 40, sequencer 17, and status registers to be described below.

As discussed above, I/O interface 11 provides for data transfer between remote I/O modules and IOIM 25. Such data transfer, which must occur each scan cycle, is carried out over an 8-bit parallel bus PARBUS (0–7) and a 1-bit (plus associated frame and clock lines) serial bus SERBUS. The parallel bus is interfaced to DATABUS(0–7) via receiver circuitry (U111,U114) and transmitter circuitry (U113,U121,U112,U120).

Serial bus SERBUS is interfaced through a shift register U129. The "left" input to shift register U129 is a bit IOIM0 from IOIM 25 while the "right" output is communicated through a driver U143 to the serial bus. The "right" input to shift register U129 is from serial bus SERBUS through a receiver U142 while the "left" output is a bit SHRG0 which is transmitted to IOIM 25. Thus, serial data can be shifted in either direction between the serial bus and IOIM 25. Shift register U129 can also transfer eight bits in parallel to or from system data bus 12 to communicate with the parallel bus or NP 15.

In the particular hardware implementation described above, microprocessor U4 operates according to a 4-cycle regime with successive clock cycles being designated T1, T2, T3, and T4. Microprocessor U4 places address information on the AD bus and the address is latched into address latch 31 during T1. Microprocessor U4 asserts the READ signal during T2, and the addressed circuit determines whether it is ready to place its data on the system data bus. To the extent that the addressed circuit is ready, it places the data operand on the bus, and the data operand is strobed onto the AD bus at the beginning of T4. As will be discussed below, wait states (designated TW) are inserted between T3 and T4 in the event that the addressed circuit is not ready. It is during such wait states that sequencer 17 and BP 20 may operate.

FIG. 7 is a timing diagram illustrating the basic timing for a circumstances where there is one wait state. The pertinent signals are designated ALE86, TISH, T2, T2T3TW, ENAMEM, READY86, and RDYSYNC.

ALE86 (address latch enable) is asserted by microprocessor U4 during T1, and has the effect of allowing address latch 31 to take the address information off the multiplexed AD bus.

TISH is a signal that is delayed relative to the T1 cycle by less than one clock cycle. TISH is asserted at the trailing edge within T1 (as validated by ALE86 being asserted), and is withdrawn at the trailing edge within T2 (as validated by ALE86 being withdrawn).

T2 is asserted at the leading edge of the clock signal (as validated by TISH being asserted) and is withdrawn at the next leading edge of the clock signal (as validated by TISH being withdrawn). This signal thus defines the T2 cycle during which the addressed circuit determines whether it is ready or not.

T2T3TW is a strobe signal used to gate the memories' outputs onto the various buses in the system. It is used to validate the BP phases during BP operation and the sequencer output word from program memory 30 during sequencer operation. T2T3TW is asserted at the leading edge of T2 (as validated by TISH being asserted) and is withdrawn at the leading edge of the first clock pulse occurring with RDYSYNC asserted. Thus T2T3TW is asserted during T2, T3, and any wait states, and is withdrawn at the leading edge of the T4 clock pulse.

ENAMEM is asserted during the T2, T3, any wait states, and T4. ENAMEM is withdrawn at the leading edge of the first clock pulse occurring after T2T3TW has been withdrawn, that is, at the end of T4.

READY86 is set up by the addressed circuit, if such addressed circuit is ready, and is asserted at the end of T3.

RDYSYNC is the signal that injects wait states into the memory accesses of microprocessor U4. RDYSYNC is asserted at the trailing edge within TW (as validated by READY86), and validates the withdrawal of T2T3TW at the leading edge of the next clock pulse. This defines T4 and allows the data operand to be sampled.

Sequencer Hardware and Timing

FIG. 8 is a simplified schematic of sequencer 17, which operates in conjunction with NP 15. As previously discussed, NP 15 and BP 20 operate in an exclusive fashion so that both are never executing instructions at the same time.

Sequencer 17 is invoked by microprocessor U4, and operates to fulfill two main functions. The first function is providing a multiplicity of control signals for initializing BP 20, loading its registers, reading its registers, modifying its status, and otherwise manipulating its various control aspects. The second function is coupling NP 15 to the I/O subsystem wherein data are communicated between the I/O modules and system data bus 12 (itself coupled to IOIM 25). In this latter sense, sequencer 17 may be viewed as an auxiliary I/O processor which is invoked by NP 15 in order to perform I/O functions with respect to which the instruction set of microprocessor U4 is not well-suited. A number of microcoded sequences are stored in the ROM elements within program memory 30 for this purpose.

Broadly, sequencer 17 includes counter U90 (shown in FIG. 6 and mentioned above), a register (U116, U123), decoding circuitry (U32, U91), and timing control circuitry (U79, U80, U81, U82).

The four low-order bits of the ADDR bus are communicated to counter U90, the outputs of which may be selected at multiplexer U100 to provide the address. When microprocessor U4 is in the I/O mode, the outputs of counter U90 are selected at multiplexer U100 to provide the four low-order address bits. Incrementing counter 90 then causes microcoded sequences of up to sixteen steps to be placed on MEMBUS(0-15).

The sequencer instructions are loaded from MEMBUS(0-15) into register (U116,U123), one bit of which (DECODE) is communicated to decoding circuitry (U32,U91) to invoke a secondary decoding regime that allows more than sixteen output bits to be extracted. Decoding circuitry (U32,U91), when invoked by the DECODE bit from register (U116,U123), decodes a number of bits from the address bus to provide auxiliary control signals for reading status ports and BAM 40, and writing into IP 32, T-register 42, and N-register 43.

Sequencer 17 has associated control circuitry which suppresses READY86 when microprocessor U4 makes an access in I/O space. Each I/O command in the instruction stream being executed by microprocessor U4 corresponds to a sequence of operations to be carried out by sequencer 17. The I/O address corresponds to an address in that portion of program 30 that can be addressed by a 16-bit (rather than 20-bit) address, and the corresponding sequence of sequencer instructions is stored starting at this address. On execution of the I/O command, the M/-IO bit is set which has the effect of holding the READY input to microprocessor U4 false. Execution of the sequencer program continues until an instruction containing END or SHORT flag appears.

Each sequencer instruction is loaded from local memory bus MEMBUS into register (U116,U123), and execution, which occurs upon the incrementing of counter U90, occupies three system clock cycles, designated SEQPH1, SEQPH2, and SEQPH3. Register (U116,U123) is loaded at the end of SEQPH3 and is cleared by the withdrawal of T2T3TW. During execution, buffer (U115,U122) between MEMBUS and system data bus 12 is put at high impedance so that sequencer 17 can use system data bus 12 for communicating with microprocessor U4.

The circuitry for effecting the 3-phase operation includes a cascaded flip-flop chain U80 with associated gates U79, U81, and U82. Flip-flop chain U80 is cleared by the withdrawal of T2T3TW and rests with SEQPH2 asserted.

Sequencer instructions are microcoded with the bit allocation as follows:

| 15 | ALLPH | Control shift register clocks |
|---|---|---|
| 14 | /END | Last sequencer instruction |
| 13 | WRIOIMFRSQ | Write to IOIM |
| 12 | MUXSQ1 | Multiplexer select |
| 11 | MUXSQ0 | |
| 10 | SHRLEFT | Shift register commands |

| | | |
|---|---|---|
| 9 | SHRIGHT | |
| 8 | RDSHRG | Read shift register |
| 7 | IOOUT | Output exchange on a bus |
| 6 | STB | Transmit strobe signal |
| 5 | SCLK/EXCHPARIO | |
| 4 | CHECKACK/STB | |
| 3 | NOWDGACK | Eliminate hardware watchdog |
| 2 | DECOD | Special function |
| 1 | /SHORT | Last instruction (short) |
| 0 | LDRIMSQ | Load RIM register |

/END indicates the last instruction of a sequencer program. The bit is complemented in the sequencer instruction because when the sequencer stops, the register holding the instruction is cleared and it is necessary in this state that the signal be logically true, even though electrically low.

/SHORT indicates the last instruction of a sequencer program, but it modifies the last instruction's execution so as to occur in two cycles rather than three. Microprocessor thus U4 restarts one clock period sooner than with an END instruction.

RDSHRG specifies reading shift register U129. The bit has two different meanings depending on whether microprocessor U4 has done an IN or an OUT instruction when starting the sequencer program. If microprocessor U4 executed an IN, RDSHRG causes the eight bits of shift register U129 to be enabled onto DATABUS(0–7) during the three (or two) cycles of the instruction. If microprocessor U4 executed an OUT and RDSHRG is true, the /RD signal controls whether shift register U129 can put its data onto the bus.

SHRIGHT and SHRLEFT control the loading and the shifting of shift register U129. When both are true, the shift register is loaded from system data bus 12; when one bit is true, the shift register is shifted in the appropriate direction.

WRIOIMFRSQ controls writing into IOIM 25. The bit allows four bits to be written into IOIM 25 during the SEQPH2 and SEQPH3 cycles, with the origin of the bits to be written being selected by MUXSQ0.

MUXSQ0 is used at the select input of multiplexer U73 to select the source of the bits incoming to the IOIM memory array.

ALLPH controls the number of loadings and shiftings of shift register U129 in an instruction. If ALLPH is true, the shift register is loaded or shifted at the end of each clock time (three times unless the SHORT bit is true in which case it is twice). If ALLPH is false, the shift register is loaded or shifted only at the end of the SEQPH3 cycle (not at all if SHORT is true).

IOOUT indicates the type of exchange, input or output, on the parallel or serial bus. True indicates output. In the hardware, IOOUT also controls the direction of the data drivers and enables all the control bits except STB onto the parallel bus. It also controls the direction of the data bits onto the serial bus. These signals are enabled onto their respective bus line or lines during the entire instruction. The bit is ended with the FRAME bit to distinguish between the parallel and the serial bus.

SCLK/EXCHPARIO, STB, CHECK ACK/STB, and NOWDGACK control various aspects of the parallel and serial buses for the I/O subsystem and will not be described further.

DECOD causes the execution of a variety of special functions which include reading and writing the following registers:

Read:
T-register 42,
N-register 43,
DAR 45,
IP 32,
BAM 40,
RIM register U76 (to be discussed below),
processor status, and
memory extension status.

Write:
T-register 42,
N-register 43,
DAR 45,
IP 32,
I/O address register,
reset the status flip-flops, and
interrupt microprocessor U7.

The particular special function done depends on the I/O address, and thereby places a constraint as to where in address space the sequencer instructions with the decode bit are placed.

FIG. 9 is a timing diagram illustrating the passage of control from NP 15 to sequencer 17, the operation of sequencer 17, and the passage of control to NP 15. The pertinent signals are SEQPH1, SEQPH2, SEQPH3, SQRQWAIT, and READY86.

SEQPH1, SEQPH2, and SEQPH3 are the sequencer phase signals generated by flip-flop chain U80. SQRQWAIT is one of the signals that controls the setting up of READY86 which validates RDY-SYNC, the signal that injects wait states into the operation of microprocessor U4. SQRQWAIT is asserted when T2T3TW and IO are asserted (i.e., during the T2 cycle of an I/O command), and causes READY86 to go false at the trailing edge within T2. SQRQWAIT goes false at the end of SEQPH1 of an END instruction, or upon the occurrence of a SHORT instruction, whereupon READY86 is asserted at the trailing edge within SEQPH2.

Boolean Processor Hardware and Timing

FIGS. 10–13 are simplified circuit schematics illustrating the various subsystems within BP 20 and its associated memory elements. As discussed above, at least the high-order four bits of a program instruction specify an opcode, while the low-order twelve bits may be operands. For structure instructions the operands are two 6-bit fields that provide source and destination addresses in BAM 40; for input instructions the operand is a 12-bit field to address IOIM 25. Although the details of the instruction execution will be discussed below, it is noted at this point that each instruction of BP 20 executes in three phases, each of which is a 135-nanosecond system clock cycle in duration. These three phases are designated BPPH1, BPPH2, and BPPH3. The portions of the instructions that are executed during the different phases are set forth in Table 3.

FIG. 10 is a simplified circuit schematic of PIPE register 33. As mentioned above, the instructions from system data bus 12 are not communicated directly to BP 20 and its memory elements, but rather are communicated through PIPE register 33. The PIPE register circuitry includes a counter U59 and a latch (U45, U60). The register output lines are designated PIPE(0–15), the four high-order bits of which provide the opcode and the twelve low-order bits of which are used to point to IOIM 25 and BAM 40. Counter U59 may be incremented under control of sequencer 17 to allow rapid transfers between IOIM 25 and system data bus 12 or shift register U129.

During operation of BP 20, each BP instruction is fetched from program memory 30, loaded into PIPE register 33, and held static through its execution. This allows a degree of pipelining between program memory 30 and BP 20 since the next instruction can be generated while the current instruction in PIPE register 33 is being executed. Thus, the operation of the program memory subsystem is one instruction ahead of the operation of BP 20. At the end of BPPH3, the next instruction is loaded into PIPE register 33, BP 20 begins to execute the just-loaded instruction, and IP 32 is incremented so that the memory system may begin to generate the next instruction. Associated with the PIPE register is the EDGE bit ("EDGE flip-flop") which is set for an EDGE mode instruction so that edge resolution may be taken into account for the next instruction.

FIG. 11 is a simplified circuit schematic of the IOIM subsystem, generally referred to as IOIM 25. In broad terms, the IOIM subsystem, when given a 12-bit address on PIPE(0-11), either generates a data bit for combinatoric logic 35 of BP 20 or accepts a data bit from it.

The actual memory is implemented as an array of memory elements U62, U63, U64, and U65, each of which contains 4K bits. The four memory elements are addressed in parallel so that each of the IOIM nodes is represented by four bits, called D, H, F, and P, having the following significance.

The D (data) bit represents the logical state of the particular IOIM location.

The H (history) bit represents the value of the D bit prior to the last time the D bit was written. Thus, the H bit provides one level of history and, in conjunction with the D bit, is used for edge detection.

The F (force) bit is initialized, set, and cleared only by NP 15 and, when set, prevents the overwriting of the corresponding history and data bits. The write suppression is carried out by hardware so that any attempt to alter a write-protected location in IOIM 25 is suppressed, but normal execution of the BP instruction stream continues.

The P (parity) bit is set to reflect odd parity of the D, H, F, and P bits to allow for error detection within IOIM 25. The parity bit is generated at an XOR gate tree U75 upon writing into an IOIM location, and is checked at another XOR gate tree U77 each time an IOIM location is read. Parity checking is transparent to the operation of BP 20 until an error occurs. Detection of an error in the IOIM parity generates a signal ERR-PTYIOIM which suppresses further writing into IOIM and causes an interrupt to microprocessor U4 in NP 15. Execution of BP 20 then stops and NP 15 assumes control.

The D, H, F, and P outputs from the IOIM memory array are communicated to a register U76, called the RIM register, having outputs designated RIMD, RIMH, RIMF, and RIMP. The D, H, and F inputs to the IOIM's memory array are provided at the respective outputs of an input multiplexer U73 which allows IOIM 25 to be loaded from system data bus 12 when sequencer 17 so dictates. Otherwise, RIMF is written into the F bit, RIMD is written into the H bit, and the output from BP 20, designated OUTBITBP, is written into the D bit. RIMH and RIMD are communicated to combinatoric logic 35. A multiplexer U56 allows the D bit to be selected from OUTBITBP or from the "left" output SHRG0 of shift register U129.

The operation during reading and writing may be outlined as follows. In phase 1, the IOIM memory chips are addressed by PIPE(0-11) and the D, H, F, and P operands appear at the outputs of the IOIM memory array. At the trailing edge of BPPH1, the four bits are loaded into RIM register U76, and parity tree U77 detects correct or incorrect parity. At the beginning of phase 2, the two bits which are of significance to the BP 20, namely RIMD and RIMH, are delivered to combinatoric logic 35 so that at the entry to phase 2, BP 20 has the input data bit (and any necessary edge information).

FIG. 12 is a simplified circuit schematic of the BAM subsystem, generally referred to as BAM 40. In a broad sense, the BAM subsystem may be visualized as a 64-bit array which either provides a bit (BITBAM) to combinatoric logic 35 or accepts a bit (NEWBIT) from logic 35. However, the actual implementation utilizes a 16×4-bit memory element U70. In order to provide single-bit addressing, the four high-order bits of address information are communicated to the address inputs of memory element U70, while the two low-order bits are communicated to the select inputs of an input multiplexer (U86,U97) and an output multiplexer U85. The four output bits BAM(0-3) from memory element U70 are wrapped around to the respective first inputs of a multiplexed holding register 71, the respective second inputs of which are coupled to system data bus 12. Output multiplexer 85 provides a straightforward 4-to-1 selection. Input multiplexer (U86,U97) provides four 4-to-1 selectors, each of which receives NEWBIT at a different one of its inputs and receives the corresponding output bit from holding register U71 at the other three of its inputs. Since the outputs of holding register U71 (designated INBAM(0-3)) reflect the current state of BAM as addressed, the injection of NEWBIT into different single inputs of the input multiplexer allows a single bit of the four bits from holding register 71 to be updated.

While the four BAM bits (prior to selection at multiplexer U85) may be placed on system data bus 12 by sequencer 17 for access by NP 15, the two low-order bits 0 and 1 (modulo 4) are made available directly to the AD bus during BP mode through a buffer (transceiver) U5 to allow four-way NPCALL vectoring.

As discussed above, the actual 6-bit address for BAM 40 is provided first by the source bit (S) field (PIPE(0-5)) from a structure instruction and then from DAR 45. Selection occurs at an address multiplexer (U57, U58). DAR 45 is implemented as a pair of 4-bit counters U42 and U43 with two of the output bits being unused.

FIG. 13 is a simplified circuit schematic of the circuitry that implements opcode decoder 34, combinatoric logic 35, T-register 42, and N-register 43. Generally, most of the circuitry is implemented as a pair of programmable array logic ("PAL") devices U46 and U47. The input and output variables and the logical relationships among them are set forth in Tables 4A-B for PAL U46 and 5A-B for PAL U47. PAL U46 has no memory storage or registers on board, and serves only to decode various aspects of the state of BP 20 to provide control signals for the BP system. PAL U47 includes the logical tree to implement the Boolean functions of BP 20 and the flip-flops to implement T-register 42 and N-register 43. The input to PAL U47 include opcode information, BITBAM, a signal (D=0orl), and a signal (T*I) which represents the logical combination of the input bit from IOIM 25 with T-register 42.

PAL U47 also includes a counter which generates a pair of signals BP0 and BP1 which are encoded in Grey code to establish basic timing for the execution of the instructions. BP0 and BP1 are communicated to a demultiplexer U53 which generates the basic timing signals BPPH1, BPPH2, and BPPH3 as well as a signal INCRIP for incrementing IP 32.

The signals RIMD and RIMH from IOIM 25 are combined with the state of T-register 42, taking into account possible complementation of the input variable as specified by the C field (PIPE14) of the input instruction and possible edge resolution (EDGE bit set). The equation of the input (I) bit read from IOIM 25 is I = −EDGE*(−PIPE14*RIMD+PIPE14*−RIMD)+EDGE*(−PIPE14*−RIMH*RIMD+PIPE14*RIMH*−RIMD)

This is implemented with an 8:1 multiplexer U48 that receives RIMH, PIPE(14), and −EDGE at its select inputs; RIMD at the 0, 4, and 5 data inputs; −RIMD at the 3, 6, and 7 data inputs; and zero at the 1 and 2 data inputs. The combination with T is taken by having T enable the multiplexer chip.

FIG. 14 is a timing diagram illustrating the passage of control from NP 15 to BP 20, the operation of BP 20, and the passage of control to NP 15. The signals relevant to the passage of control are ARMBP, RTNTONP, NPMODE, BPMODE, NEXECBP, and READY86. The signals relevant to BP operation are BP0, BP1, BPPHH1, BPPH2, BPPH3, and INCRIP.

Except upon initialization, the passage of control from NP 15 may be viewed as the return from a subroutine call (NPCALL). The special instruction used to effect this is a memory instruction with an operand located in a particular address range (4000H-7FFFH), designated DONE. ARMBP is asserted during T2 when the address decoding circuitry determines that a memory instruction seeks to address a location in the DONE range.

RTNTONP is an output from PAL U46 and is asserted during the first phase of an NPCALL instruction.

NPMODE and BPMODE are a pair of complementary signals used to control a number of functions. BPMODE is asserted at the beginning of T3 when ARMBP has been asserted. NPMODE is asserted at the beginning of the second phase of an NPCALL instruction. BPMODE allows the overall operation of BP 20 including the operation of PAL's U46 and U47. When BPMODE is asserted, IP 32 drives ADDR (1-16); when NPMODE is asserted, address latch 31 drives ADDR (1-16).

Following the assertion of BPMODE, READY86 is withdrawn so that wait states are injected. NEXECBP is held true during the first three wait state cycles to suppress BP operation. This allows the instruction pointed to by instruction pointer 32 to be accessed and loaded into PIPE register 33. This instruction can then be executed by BP 20 during the next three cycles while the next instruction is fetched.

During BP operation NP 15 awaits a memory operand. During the BPPH3 phase of all BP instructions, the hardware provides an address at the input of address latch 31. This address is loaded into the address latch at the end of BPPH3 and, if the BP instruction is an NPCALL, the address provides the awaited operand.

BP0 and BP1 are the basic BP timing signals. Their decode provides the phases BPPH1, BPPH2, and BPPH3 and are in a gray code in order to avoid the risk of spurious transients at the input of decoder U53.

Conclusion

In summary it can be seen that the present invention provides a BP whose architecture (as defined by the instruction set and basic organization) allows it to solve substantially the entire range of problems of interest. The BP is relatively inexpensive, yet is extremely fast and efficient.

While the above is a full description of the preferred embodiment, various modifications, alternate constructions, and equivalents may be used without departing from the sprit of the invention. For example, BAM 40 could be incorporated as a part of the same physical memory element as program memory 30. Additionally, a slower version could be built utilizing gate arrays to reduce the number of circuit components. Conversely, a faster (but more expensive) version could utilize small scale integration rather than the medium scale integration of the preferred embodiment.

Therefore, the above description and illustrations should not be taken as limiting the scope of the invention which is defined by the appended claims.

TABLE 1

| Abbreviations Used in Specification | |
|---|---|
| BAM | Binary Accumulator Memory |
| BCP | Best Case Program |
| BP | Boolean Processor |
| DAR | Destination Address Register |
| IOIM | Input/Output Image Memory |
| IP | Instruction Pointer |
| NP | Numerical Processor |
| PAL | Programmable Array Logic |
| PC | Programmable Controller |
| WCP | Worst Case Program |

TABLE 2

| | Circuit Element Designations | | |
|---|---|---|---|
| Reference Number | Component Type | Component Model | Sheet In Microfiche |
| U4 | microprocessor | 8086 | 1 |
| U7 | microprocessor | 8051 | 1 |
| U6 | transparent latch | 74F373 | 2 |
| U8 | " | " | 2 |
| U18 | " | " | 2 |
| U90 | counter | 74LS163 | 4 |
| U100 | multiplexer | 74LS157 | 4 |
| U87 | counter | 74LS163 | 2 |
| U88 | " | " | 2 |
| U98 | " | " | 2 |
| U99 | " | " | 2 |
| U89 | buffer | 74F244 | 2 |
| U107 | " | " | 2 |
| U150 | 8K × 8 RAM | 5564PL-1 | 18 |
| U151 | " | " | 18 |
| U152 | 8K × 8 ROM | 2764 | 19 |
| U153 | " | " | 19 |
| U154 | " | " | 19 |
| U155 | " | " | 19 |
| U115 | bus transceiver | 74LS245 | 4 |
| U122 | " | " | 4 |
| U3 | bus transceiver | 74LS245 | 2 |
| U16 | " | " | 2 |
| U17 | " | " | 2 |
| U111 | buffer | 4010 | 14 |
| U114 | latch | 74LS273 | 14 |
| U113 | buffer | 7407 | 14 |
| U121 | " | " | 14 |
| U112 | " | 14503 | 14 |
| U120 | " | " | 14 |

TABLE 2-continued

Circuit Element Designations

| Reference Number | Component Type | Component Model | Sheet In Microfiche |
|---|---|---|---|
| U129 | shift register | 74S299 | 6 |
| U143 | buffer | 26LS31 | 7 |
| U142 | buffer | 26LS32 | 7 |
| U116 | transparent latch | 74LS273 | 5 |
| U123 | " | " | 5 |
| U32 | decoder | 74LS138 | 11 |
| U91 | " | " | 11 |
| U79 | 3-input NAND | 74LS10 | 5 |
| U42 | 4-bit counter | 74LS163 | 9 |
| U43 | " | " | 9 |
| U46 | PAL 16L8 | 82S153 | 10 |
| U47 | PAL 16R6 | 82S157 | 10 |
| U53 | decoder | 74S139 | 10 |
| U48 | multiplexer | 74LS151 | 10 |
| U80 | quad D-type flip-flop | 74LS175 | 5 |
| U81 | 2-input NOR gate | 74LS02 | 5 |
| U82 | 3-input NAND | 74S10 | 5 |
| U59 | counter | 74LS163 | 6 |
| U45 | transparent latch | 74LS273 | 10 |
| U60 | " | " | 10 |
| U62 | 4K × 1 RAM | 6147LP | 6 |
| U63 | " | " | 6 |
| U64 | " | " | 6 |
| U65 | " | " | 6 |
| U75 | XOR gates (3) | 74LS86 | 6 |
| U77 | XOR gates (3) | 74LS86 | 6 |
| U76 | quad D-type flip-flop | 74LS175 | 6 |
| U73 | multiplexer | 74LS157 | 6 |
| U56 | multiplexer | 74LS157 | 10 |
| U70 | 16 × 4 memory | 74S189 | 9 |
| U86 | multiplexer | 74LS153 | 9 |
| U97 | " | " | 9 |
| U85 | multiplexer | 74S153 | 9 |
| U71 | quad 2-port register | 74LS298 | 9 |
| U5 | transceiver | 74LS245 | 1 |
| U57 | multiplexer | 74LS157 | 9 |
| U58 | " | " | 9 |

TABLE 3

Instruction Execution

The following outlines the execution of all the BP instructions for each of the three phases. In these charts the names between parentheses shows that it is a BAM bit. SB and NB are the SBAM and NEWBIT flip-flops in PAL 16R6 (U47).

| | BPPH1 | | | BPPH2 | | | BPPH3 | | |
|---|---|---|---|---|---|---|---|---|---|
| STACK | LDRIM | | | NB | ← | T,I | (DR) | ← | NB |
| | DR | ← | DR+1 | — | | | IP | ← | IP+1 |
| | SB | ← | (S) | — | | | T | ← | N |
| AND D | LDRIM | | | NB←F((DR),T,I) | | | (DR) | ← | NB |
| AND-OR D | SB | ← | (S) | — | | | IP | ← | IP+1 |
| AND T | | | | — | | | T | ← | N |
| INIT S,D | SB | ← | (S) | NB | ← | (DR) | (DR) | ← | NB |
| If D=0 | | | | — | | | IP | ← | IP+1 |
| or 1. | | | | — | | | T | ← | SB |
| | | | | — | | | N | ← | SB |
| INIT S,D | DR | ← | D | NB | ← | 0 | (DR) | ← | NB |
| If D≠0 | SB | ← | (S) | — | | | IP | ← | IP+1 |
| or 1. | | | | — | | | T | ← | SB |
| | | | | — | | | N | ← | SB |
| AND S,D | DR | ← | D | NB←F((DR),SB) | | | (DR) | ← | NB |
| OR S,D | SB | ← | (S) | — | | | IP | ← | IP+1 |
| NOT S,D | | | | — | | | T | ← | 1 |
| | | | | — | | | N | ← | 1 |
| MODE | | | | — | | | EDGE | ← | 1 |
| EDGE | | | | — | | | IP | ← | IP+1 |
| MODE | | | | — | | | OUTPUT | ← | 1 |
| OUTPUT | | | | — | | | IP | ← | IP+1 |
| | | | | — | | | DR | ← | D |
| MODE NOP | — | | | — | | | IP | ← | IP+1 |
| OUTPUT LIST | LDRIM DR←DR+PIPE14 | | | WIOIM | | | WIOIM OUTPUT←PIPE15 | | |
| | SB | ← | (DR) | — | | | IP | ← | IP+1 |
| NPCALL | — | | | — | | | — | | |

TABLE 4A

PAL 16L8 (U46) Pinouts

| Pin | I/O | Name of Signal |
|---|---|---|
| 1 | I | -BP1 |
| 2 | I | -BP0 |
| 3 | I | NEXECBP |
| 4 | I | ALARMBP |
| 5 | I | -OUTPUT |
| 6 | I | PIPE15 |
| 7 | I | PIPE14 |
| 8 | I | PIPE13 |
| 9 | I | PIPE12 |
| 11 | I | PIPE00 |
| 12 | O | -(I+SD+NPCALL) |
| 13 | I | (D=0 or 1) |
| 14 | O | MODE |
| 15 | O | -WIOIMFRBP |
| 16 | O | RTNTONP |
| 17 | O | -INCDR/OUT |
| 18 | O | -LDDRBP |
| 19 | O | -WRBAM/TN |

TABLE 4B

PAL 16L8 (U46) Equations $$(I+SD+NPCALL) = \text{-NEXECBP*-ALARMBP*-OUTPUT*PIPE15} +$$
$$\text{-NEXECBP*-ALARMBP*-OUTPUT*PIPE14} +$$
$$\text{-NEXECBP*-ALARMBP*-OUTPUT*PIPE13}$$
$$\text{-MODE} = \text{NEXECBP + ALARMBP + OUTPUT +}$$
$$\text{PIPE12 + PIPE13 + PIPE14 + PIPE15}$$

TABLE 4B-continued

PAL 16L8 (U46) Equations

```
 WIOIMFRBP = -NEXECBP*-ALARMBP*OUTPUT*BP0
  -RTNTONP = NEXECBP + -ALARMBP*OUTPUT +
             -ALARMBP*-PIPE13 + -ALARMBP*PIPE14 +
             -ALARMBP*PIPE15 + BP1 + -BP0
  INCDR/OUT = -NEXECBP*-ALARMBP*-OUTPUT*PIPE15*
             -PIPE13*-PIPE12*-BP1*BP0 +
             -NEXECBP*-ALARMBP*OUTPUT*PIPE14*-BP1*BP0 +
             -NEXECBP*-ALARMBP*-OUTPUT*-PIPE15*
             -PIPE14*-PIPE13*-PIPE12*PIPE00*BP1 +
             -NEXECBP*-ALARMBP*OUTPUT*-PIPE15*BP1
    LDDRBP = -NEXECBP*-ALARMBP*-OUTPUT*-PIPE15*
             PIPE14*-(D=0orl)*-BP1*BP0 +
             -NEXECBP*-ALARMBP*-OUTPUT*-PIPE15*
             PIPE14*-PIPE13*-BP1*BP0 +
             -NEXECBP*-ALARMBP*-OUTPUT*-PIPE15*
             PIPE14*-PIPE12*-BP1*BP0 +
             -NEXECBP*-ALARMBP*-OUTPUT*-PIPE15*
             -PIPE14*-PIPE13*-PIPE12*PIPE00*BP1*-BP0
  WRBAM/TN = -NEXECBP*-ALARMBP*-OUTPUT*PIPE15*BP1*-BP0 +
             -NEXECBP*-ALARMBP*-OUTPUT*PIPE14*BP1*-BP0
```

TABLE 5A

PAL 16R6 (U47) Pinouts

| Pin | I/O | Name of Signal |
|-----|-----|----------------|
| 2   | I   | (T*1)          |
| 3   | I   | BITBAM         |
| 4   | I   | (D=0orl)       |
| 5   | I   | PIPE15         |
| 6   | I   | PIPE13         |
| 7   | I   | PIPE12         |
| 8   | I   | RIMD           |
| 9   | I   | WRTN           |
| 12  | I   | CPTBP          |
| 19  | O   | OUTBITBP       |
| 18  | O   | -T             |
| 17  | O   | -N             |
| 16  | O   | -SBAM          |
| 15  | O   | -NEWBIT        |
| 14  | O   | -BP1           |
| 13  | O   | -BP0           |

TABLE 5B

PAL 16R6 (U47) Equations

```
-OUTBITBP = -PIPE13*-PIPE12*-SBAM +
            -PIPE13*PIPE12*SBAM +
            PIPE13*-PIPE12*SBAM +
            PIPE13*-PIPE12*-RIMD +
            PIPE13*PIPE12*-RIMD*-SBAM
        T = WRTN*BP1*-BP0*N*PIPE15*-PIPE13 +
            WRTN*BP1*-BP0*N*PIPE15*-PIPE12 +
            WRTN*BP1*-BP0*(T*I)*PIPE15*PIPE13*PIPE12 +
            WRTN*BP1*-BP0*SBAM*-PIPE15*PIPE13*PIPE12 +
            WRTN*BP1*-BP0*-PIPE15*-PIPE13 +
            WRTN*BP1*-BP0*-PIPE15*-PIPE12 +
            WRTN*BP1*-BP0*-PIPE13 +
            -WRTN*T
        N = WRTN*BP1*-BP0*N*PIPE15 +
            WRTN*BP1*-BP0*SBAM*-PIPE15*PIPE13*PIPE12 +
            WRTN*BP1*-BP0*-PIPE15*-PIPE13 +
            WRTN*BP1*-BP0*-PIPE15*-PIPE12 +
            WRTN*BP1*-BP0*-PIPE12 +
            -WRTN*N
     SBAM = -BP1*BITBAM + BP1*SBAM
    NEWBIT = (T*I)*PIPE15*-PIPE12 +
            BITBAM*PIPE15*PIPE13 +
            BITBAM*(T*I)*PIPE15 +
            BITBAM*-PIPE15*PIPE13*PIPE12*(D=0orl) +
            BITBAM*-PIPE15*-PIPE13*PIPE12 +
            SBAM*-PIPE15*-PIPE13*PIPE12 +
            BITBAM*SBAM*-PIPE15*PIPE13*-PIPE12 +
            -SBAM*-PIPE15*-PIPE13*-PIPE12
      BP0 = CPTBP*-BP0 + -BP1*BP0
      BP1 = BP0
```

What is claimed is:

1. A Boolean processor for manipulating a plurality of Boolean variables stored in an associated I/O image memory by executing programs stored in an associated program memory, comprising:

a node memory having a plurality of individually addressable locations; AT- register; a destination register; and means for interpreting instructions fetched from the associated program memory and directing corresponding operations including means, activated on the occurrence of at least one of a first class of instructions (structure instructions), for specifying selected first and second node memory locations in said node memory, storing the address of said second node memory location in said address destination register, performing a binary logical operation on the logical values stored in said first and second node memory locations, and storing the result of said binary logical operation in said second node memory location, and means, activated on the occurrence of a second class of instructions (input instructions), for specifying a selected location in the associated I/O image memory, reading an input variable from said selected location in the associated I/O image memory and performing a logical AND between said input variable and the content of said T-register.

2. The Boolean processor of claim 1 wherein each of said structure instructions includes as operands the addresses of said first and second node memory locations.

3. The Boolean processor of claim 1 wherein at least one of said input instructions specifies a logical combination of said input variable and the content of a location in said node memory.

4. A Boolean processor for executing programs stored in an associated program memory, said program memory having a multi-bit output defining an opcode field and an operand field, comprising:

an I/O image memory having an address input operatively coupled to at least a portion of said operand field, and also having a data input and a data output;

a destination address register having an input operatively coupled to at least a portion of said operand field, and also having an output;

a node memory having a plurality of individually addressable locations, said node memory having an address input operatively coupled both to the output of said destination address register and to at least a portion of said operand field, and also having a data input and a data output;

an N-register, having an input operatively coupled to the data output of said node memory, and also having an output;

a T-register, having an input operatively coupled both to the data output of said node memory and to the output of said N-register, and also having an output;

an opcode decoder having an input operatively coupled to said opcode field and responsive to the contents thereof, being capable of discriminating between at least a subset of structure instructions and a subset of input instructions, and also having a control output;

combinatoric logic means having data inputs operatively coupled to the output of said T-register, to the data output of said node memory, and to the data output of said I/O image memory, and having data outputs operatively coupled to the data input of said node memory and to the input of said T-register, and also having a control input operatively coupled to the control output of said opcode decoder; and control means operatively coupled to said opcode decoder, for establishing data flow as follows:

(a) upon the occurrence of at least one of said structure instructions, (i) to supply a source address appearing in at least a portion of said operand field to the address input of said node memory to provide a node value at the data output of said node memory, and (ii) to load said destination register with a destination address appearing in at least a portion of said operand field;

(b) upon the occurrence of at least one of said input instructions, (i) to supply an I/O address appearing in at least a portion of said operand field to the address input of said I/O image memory to provide an input variable at the data output of said I/O image memory, and (ii) to supply said input variable to said combinatoric logic means.

5. A Boolean processor for manipulating a plurality of Boolean variables stored in an associated I/O image memory by executing programs stored in an associated program memory, comprising:

a destination address register;

a node memory having a pluality of individually addressable locations;

an N-register;

a T-register;

an opcode decoder responsive to an instruction fetched from the associated program memory and capable of discriminating between at least a subset of structure instructions and a subset of input instructions;

combinatoric logic means operable to receive as inputs the content of said T-register, a bit from said node memory, and an output bit from the associated I/O image memory, and operable to provide outputs to said node memory and to said T-register; and control means operatively coupled to said opcode decoder and to said combinatoric logic means for establishing data flow as follows:

(a) upon the occurrence of at least one of said structure instructions, (i) supply a source address S to said node memory, (ii) supply a destination address D to said node memory and for at least a range of values of D store said destination address D in said destination address register, (iii) for D in said range, logically combine the content of node memory location S with the content of node memory location D, and (iv) for D in said range, store the logical combination thus obtained in node memory location D; and (b) upon the occurrence of at least one of said input instructions, (i) supply an I/O address to the associated I/O image memory and extract an input variable therefrom, and (ii) logically combine said input variable with the content of the node memory location addressed by the content of said destination address register.

6. The Boolean processor of claim 5 wherein the execution of at least one of said structure instructions with a value of D outside said range results in no change to the contents of said destination address register or to node memory location D.

7. The Boolean processor of claim 5 wherein:

said range excludes the values 0 and 1; and execution of none of said structure instructions with D equal 0 or 1 results in a change to the contents of said destination address register or to node memory location D.

8. The Boolean processor of claim 5 wherein said structure instructions include an INIT instruction, the occurrence of which causes said combinatoric logic means and said control means to establish data flow as follows:
  (a) for D in said range, store a logical 0 in node memory location D; and
  (b) store the content of node memory location S in said N-register and said T-register.

9. The Boolean processor of claim 5 wherein said structure instructions include an AND instruction, the occurrence of which causes said combinatoric logic means and said control means to establish data flow as follows:
  (a) for D in said range, logically AND the content of node memory location S with the content of node memory location D;
  (b) store the result in node memory location D; and
  (c) store a logical 1 in said N-register and said T-register.

10. The Boolean processor of claim 5 wherein said structure instructions include an OR instruction, the occurrence of which causes said combinatoric logic means and said control means to establish data flow as follows:
  (a) for D in said range, logically OR the content of node memory location S with the content of node memory location D;
  (b) store the result in node memory location D; and
  (c) store a logical 1 in said N-register and said T-register.

11. The Boolean processor of claim 5 wherein said structure instructions include a NOT instruction, the occurrence of which causes said combinatoric logic means and said control means to establish data flow as follows:
  (a) for D in said range, store the logical complement of the content of node memory location S in node memory location D; and
  (b) store a logical 1 in said N-register and said T-register.

12. The Boolean processor of claim 5 wherein said input instructions include a STACK instruction, the occurrence of which causes said combinatoric logic means and said control means to establish data flow as follows:
  (a) increment the content of said destination address register;
  (b) logically AND the content of said T-register and said input variable;
  (c) store the result in the node memory location addressed by said destination address register as incremented; and
  (d) store the content of said N-register in said T-register.

13. The Boolean processor of claim 5 wherein said input instructions include an AND D instruction, the occurrence of which causes said combinatoric logic means and said control means to establish data flow as follows:
  (a) logically AND said input variable, the content of said T-register, and the content of the node memory location addressed by the content of said destination address register;
  (b) store the result in the node memory location addressed by the content of said destination address register; and
  (c) store the content of said N-register in said T-register.

14. The Boolean processor of claim 5 wherein said input structions include an AND-OR D instruction, the occurrence of which causes said combinatoric logic means and said control means to establish data flow as follows:
  (a) logically AND the content of said T-register and said input variable, and logically OR the result with the content of the node memory location addressed by the content of said destination address register;
  (b) store the result in the node memory location addressed by the content of said destination address register; and
  (c) store the content of said N-register in said T-register.

15. The Boolean processor of claim 5 wherein said input instructions include and AND T instruction, the occurrence of which causes said combinatoric logic means and said control means to establish data flow as follows:
  (a) logically AND said input variable and the content of said T-register; and
  (b) store the result in said T-register.

16. A Boolean processor for manipulating a plurality of Boolean variables stored in an associated I/O image memory by executing programs stored in an associated program memory, comprising:
  a destination address register;
  a node memory having a plurality of individually addressable locations;
  an N-register;
  a T-register;
  an opcode decoder responsive to an instruction fetched from the associated program memory and capable of discriminating between at least a subset of structure instructions and a subset of input instructions;
  combinatoric logic means operpable to receive as inputs the content of said T-register, a bit from said node memory, and an output bit from the associated I/O image memory, and operable to provide outputs to said node memory and to said T-register; and
  control means operatively coupled to said opcode decoder and to said combinatoric logic means for establishing data flow as follows:
    (a) upon the occurrence of each of said structure instructions, perform at least one of the following operations, numbered (a)(i) through (a)(ix):
      (i) extract a source address S and read out the content of node memory location S,
      (ii) extract a destination address D, and for at least a range of values of D, store D in said destination address register,
      (iii) extract a destination address D, and for at least a range of values of D, store D in said destination address register and read out the content of node memory location D,
      (iv) for D in said range, store a logical 0 in node memory location D,
      (v) for D in said range, logically AND the content of node memory location S with the content of node memory location D and store the result in node memory location D,
      (vi) for D in said range, logically OR the content of node memory location S with the content of node memory location D and store the resulot in node memory location D, (vii) for D in said range, store the logical complement of node memory location S in node memory location D, (viii) store the content of node memory location S in said N-register and said T-register, (ix) store a logical 1 in said N-register and said T-register; and (b) upon the occurrence of each of said input instructions peform at least one of the following operations, numbered (b)(i) through (b)(vii):

(i) supply an I/O address to said I/O image memory and read an input variable therefrom, (ii) logically AND said input variable with the content of said T-register, (iii) increment said destination address register, (iv) copy the content of said N-register into said T-register, (v) logically AND said input variable, the content of said T-register, and the content of the node memory location addressed by the content of said destination register, (vi) logically AND said input variable and the content of said T-register, and logically OR the result with the content of the node memory location addressed by the content of said destination register, (vii) logically AND said input variable and the content of said T-register, and store the result in said T-register.

17. The Boolean processor of claim 16 wherein said structure instructions include an INIT instruction, the occurrence of which causes said combinatoric logic means and said control means to perform said operations (a)(i), (a)(ii), (a)(iv), and (a)(viii).

18. The Boolean processor of claim 16 wherein said structure instructions include an AND instruction, the occurrence of which causes said combinatoric logic means and said control means to perform said operations (a)(i), (a)(iii), (a)(v), and (a)(ix).

19. The Boolean processor of claim 16 wherein said structure instructions include an OR instruction, the occurrence of which causes said combinatoric logic means and said control means to perform said operations (a)(i), (a)(iii), (a)(vi), and (a)(ix).

20. The Boolean processor of claim 16 wherein said structure instructions include a NOT instruction, the occurrence of which causes said combinatoric logic means and said control means to perform said operations (a)(i), (a)(ii), (a)(vii), and (a)(ix).

21. The Boolean processor of claim 16 wherein said input instructions includes a STACK instruction, the occurrence of which causes said combinatoric logic means and said control means to perform said operations (b)(i), (b)(ii), (b)(iii), and (b)(iv).

22. The Boolean processor of claim 16 wherein said input instructions include an AND D instruction, the occurrence of which causes said combinatoric logic means and said control means to perform said operations (b)(i), (b)(iv), and (b)(v).

23. The Boolean processor of claim 16 wherein said input instructions include an AND-OR D instruction, the occurrence of which causes said combinatoric logic means and said control means to perform said operations (b)(i), (b)(iv), and (b)(vi).

24. The Boolean processor of claim 16 wherein said structure instructions include an AND T instruction, the occurrence of which causes said combinatoric logic means and said control means to perform said operations (b)(i) and (b)(vii).

* * * * *